United States Patent
Hubbard et al.

(10) Patent No.: US 8,020,206 B2
(45) Date of Patent: Sep. 13, 2011

(54) SYSTEM AND METHOD OF ANALYZING WEB CONTENT

(75) Inventors: Dan Hubbard, Carlsbad, CA (US); Nicholas Joseph Verenini, San Diego, CA (US); Victor Louie Baddour, San Diego, CA (US)

(73) Assignee: Websense, Inc., San Diego, CA (US)

( * ) Notice: Subject to any disclaimer, the term of this patent is extended or adjusted under 35 U.S.C. 154(b) by 1374 days.

(21) Appl. No.: 11/484,240

(22) Filed: Jul. 10, 2006

(65) Prior Publication Data

US 2008/0010368 A1    Jan. 10, 2008

(51) Int. Cl.
*H04L 29/06* (2006.01)
*G06F 7/04* (2006.01)

(52) U.S. Cl. ......... 726/22; 726/1; 726/2; 726/3; 726/13; 726/23; 726/24; 726/27; 726/30; 713/154; 713/160; 713/161; 713/165

(58) Field of Classification Search ............ 726/22, 726/3, 26; 713/154, 165
See application file for complete search history.

(56) References Cited

U.S. PATENT DOCUMENTS

| | | | |
|---|---|---|---|
| 4,423,414 A | 12/1983 | Bryant et al. | |
| 4,734,036 A | 3/1988 | Kasha | |
| 4,941,084 A | 7/1990 | Terada et al. | |
| 5,408,642 A | 4/1995 | Mann | |
| 5,493,692 A | 2/1996 | Theimer et al. | |
| 5,541,911 A | 7/1996 | Nilakantan et al. | |
| 5,548,729 A | 8/1996 | Akiyoshi et al. | |
| 5,555,376 A | 9/1996 | Theimer et al. | |
| 5,581,703 A | 12/1996 | Baugher et al. | |
| 5,586,121 A | 12/1996 | Moura et al. | |
| 5,606,668 A | 2/1997 | Shwed | |
| 5,648,965 A | 7/1997 | Thadani et al. | |
| 5,678,041 A | 10/1997 | Baker et al. | |
| 5,682,325 A | 10/1997 | Lightfoot et al. | |
| 5,696,486 A | 12/1997 | Poliquin et al. | |
| 5,696,898 A | 12/1997 | Baker et al. | |
| 5,699,513 A | 12/1997 | Feigen et al. | |
| 5,706,507 A * | 1/1998 | Schloss ................. 709/225 |

(Continued)

FOREIGN PATENT DOCUMENTS

EP    0 658 837 A2    12/1994

(Continued)

OTHER PUBLICATIONS

C. L. Schuba and E. H. Spafford, Countering abuse of name-based authentication, Pub: In 22nd Annual Telecommunications Policy Research Conference, 1996, pp. 21.

(Continued)

*Primary Examiner* — Edan Orgad
*Assistant Examiner* — Jenise Jackson
(74) *Attorney, Agent, or Firm* — Knobbe Martens Olson & Bear LLP

(57) ABSTRACT

A system and method are provided for identifying inappropriate content in websites on a network. Unrecognized uniform resource locators (URLs) or other web content are accessed by workstations and are identified as possibly having malicious content. The URLs or web content may be preprocessed within a gateway server module or some other software module to collect additional information related to the URLs. The URLs may be scanned for known attack signatures, and if any are found, they may be tagged as candidate URLs in need of further analysis by a classification module.

15 Claims, 16 Drawing Sheets

U.S. PATENT DOCUMENTS

| | | | |
|---|---|---|---|
| 5,712,979 A | 1/1998 | Graber et al. | |
| 5,720,033 A | 2/1998 | Deo | |
| 5,724,576 A | 3/1998 | Letourneau | |
| 5,742,759 A | 4/1998 | Nessett et al. | |
| 5,758,257 A | 5/1998 | Herz et al. | |
| 5,768,519 A | 6/1998 | Swift et al. | |
| 5,774,668 A | 6/1998 | Choquier | |
| 5,781,801 A | 7/1998 | Flanagan et al. | |
| 5,787,253 A | 7/1998 | McCreery et al. | |
| 5,787,427 A | 7/1998 | Benantar et al. | |
| 5,796,944 A | 8/1998 | Hill et al. | |
| 5,799,002 A | 8/1998 | Krishnan | |
| 5,801,747 A | 9/1998 | Bedard | |
| 5,826,014 A | 10/1998 | Coley et al. | |
| 5,828,833 A | 10/1998 | Belville et al. | |
| 5,828,835 A | 10/1998 | Isfeld et al. | |
| 5,832,212 A | 11/1998 | Cragun et al. | |
| 5,832,228 A | 11/1998 | Holden et al. | |
| 5,832,503 A | 11/1998 | Malik et al. | |
| 5,835,722 A | 11/1998 | Bradshaw et al. | |
| 5,835,726 A | 11/1998 | Shwed et al. | |
| 5,842,040 A | 11/1998 | Hughes et al. | |
| 5,848,233 A | 12/1998 | Radia et al. | |
| 5,848,412 A | 12/1998 | Rowland et al. | |
| 5,850,523 A | 12/1998 | Gretta, Jr. | |
| 5,855,020 A | 12/1998 | Kirsch | |
| 5,864,683 A | 1/1999 | Boebert et al. | |
| 5,884,033 A | 3/1999 | Duvall et al. | |
| 5,884,325 A | 3/1999 | Bauer et al. | |
| 5,889,958 A | 3/1999 | Willens | |
| 5,892,905 A | 4/1999 | Brandt et al. | |
| 5,896,502 A | 4/1999 | Shieh et al. | |
| 5,898,830 A | 4/1999 | Wesinger et al. | |
| 5,899,995 A | 5/1999 | Millier et al. | |
| 5,911,043 A | 6/1999 | Duffy et al. | |
| 5,933,827 A | 8/1999 | Cole et al. | |
| 5,937,404 A | 8/1999 | Csaszar et al. | |
| 5,941,947 A | 8/1999 | Brown et al. | |
| 5,944,794 A | 8/1999 | Okamoto et al. | |
| 5,950,195 A | 9/1999 | Stockwell et al. | |
| 5,958,015 A | 9/1999 | Dascalu | |
| 5,961,591 A | 10/1999 | Jones et al. | |
| 5,968,176 A | 10/1999 | Nessett et al. | |
| 5,978,807 A | 11/1999 | Mano et al. | |
| 5,983,270 A | 11/1999 | Abraham et al. | |
| 5,987,606 A | 11/1999 | Cirasole et al. | |
| 5,987,610 A * | 11/1999 | Franczek et al. | 726/24 |
| 5,987,611 A | 11/1999 | Freund | |
| 5,991,807 A | 11/1999 | Schmidt et al. | |
| 5,996,011 A | 11/1999 | Humes | |
| 6,052,723 A | 4/2000 | Ginn | |
| 6,052,730 A | 4/2000 | Felciano et al. | |
| 6,055,564 A | 4/2000 | Phaal | |
| 6,065,056 A | 5/2000 | Bradshaw et al. | |
| 6,065,059 A | 5/2000 | Shieh et al. | |
| 6,070,242 A | 5/2000 | Wong et al. | |
| 6,073,239 A | 6/2000 | Dotan | |
| 6,078,913 A | 6/2000 | Aoki et al. | |
| 6,085,241 A | 7/2000 | Otis | |
| 6,092,194 A | 7/2000 | Touboul | |
| 6,105,027 A | 8/2000 | Schneider et al. | |
| 6,154,741 A | 11/2000 | Feldman | |
| 6,173,364 B1 | 1/2001 | Zenchelsky et al. | |
| 6,178,419 B1 | 1/2001 | Legh-Smith et al. | |
| 6,178,505 B1 | 1/2001 | Schneider et al. | |
| 6,182,118 B1 | 1/2001 | Finney et al. | |
| 6,219,667 B1 | 4/2001 | Lu et al. | |
| 6,233,618 B1 * | 5/2001 | Shannon | 709/229 |
| 6,233,686 B1 | 5/2001 | Zenchelsky et al. | |
| 6,253,188 B1 | 6/2001 | Witek et al. | |
| 6,226,664 B1 | 7/2001 | Russell-Falla et al. | |
| 6,256,739 B1 | 7/2001 | Skopp et al. | |
| 6,275,938 B1 * | 8/2001 | Bond et al. | 726/23 |
| 6,295,559 B1 | 9/2001 | Emens et al. | |
| 6,338,088 B1 | 1/2002 | Waters et al. | |
| 6,357,010 B1 | 3/2002 | Viets et al. | |
| 6,377,577 B1 | 4/2002 | Bechtolsheim et al. | |
| 6,418,433 B1 | 7/2002 | Chakrabarti et al. | |
| 6,446,119 B1 | 9/2002 | Olah et al. | |
| 6,456,306 B1 | 9/2002 | Chin et al. | |
| 6,460,141 B1 | 10/2002 | Olden | |
| 6,466,940 B1 | 10/2002 | Mills | |
| 6,486,892 B1 | 11/2002 | Stern | |
| 6,519,571 B1 | 2/2003 | Guheen et al. | |
| 6,567,800 B1 | 5/2003 | Barrera et al. | |
| 6,571,249 B1 | 5/2003 | Garrecht et al. | |
| 6,606,659 B1 | 8/2003 | Hegli et al. | |
| 6,741,997 B1 | 5/2004 | Liu et al. | |
| 6,742,003 B2 | 5/2004 | Heckerman et al. | |
| 6,785,732 B1 | 8/2004 | Bates et al. | |
| 6,804,780 B1 | 10/2004 | Touboul | |
| 6,807,558 B1 | 10/2004 | Hassett et al. | |
| 6,832,230 B1 | 12/2004 | Zilliacus et al. | |
| 6,832,256 B1 | 12/2004 | Toga | |
| 6,839,680 B1 * | 1/2005 | Liu et al. | 705/10 |
| 6,894,991 B2 | 5/2005 | Ayyagari et al. | |
| 6,907,425 B1 | 6/2005 | Barrera et al. | |
| 6,947,935 B1 | 9/2005 | Horvitz et al. | |
| 6,947,985 B2 | 9/2005 | Hegli et al. | |
| 6,978,292 B1 | 12/2005 | Murakami et al. | |
| 6,984,991 B2 | 5/2006 | Ayyagari et al. | |
| 7,058,822 B2 | 6/2006 | Edery et al. | |
| 7,089,246 B1 | 8/2006 | O'laughlen | |
| 7,093,293 B1 | 8/2006 | Smithson et al. | |
| 7,096,493 B1 | 8/2006 | Liu | |
| 7,185,015 B2 | 2/2007 | Kester et al. | |
| 7,185,361 B1 | 2/2007 | Ashoff et al. | |
| 7,197,713 B2 | 3/2007 | Stern | |
| 7,209,893 B2 | 4/2007 | Nii | |
| 7,213,069 B2 | 5/2007 | Anderson et al. | |
| 7,313,823 B2 | 12/2007 | Gao | |
| 7,359,372 B2 | 4/2008 | Pelletier et al. | |
| 7,370,365 B2 | 5/2008 | Carroll et al. | |
| 7,376,154 B2 | 5/2008 | Ilnicki et al. | |
| 7,603,685 B2 | 10/2009 | Knudson et al. | |
| 7,603,687 B2 | 10/2009 | Pietraszak et al. | |
| RE41,168 E * | 3/2010 | Shannon | 709/229 |
| 7,690,013 B1 | 3/2010 | Eldering et al. | |
| 2001/0032258 A1 | 10/2001 | Ishida et al. | |
| 2001/0039582 A1 | 11/2001 | McKinnon et al. | |
| 2001/0047343 A1 * | 11/2001 | Dahan et al. | 705/76 |
| 2002/0042821 A1 | 4/2002 | Muret et al. | |
| 2002/0049883 A1 | 4/2002 | Schneider et al. | |
| 2002/0062359 A1 * | 5/2002 | Klopp et al. | 709/219 |
| 2002/0073089 A1 | 6/2002 | Schwartz et al. | |
| 2002/0110084 A1 | 8/2002 | Butt et al. | |
| 2002/0129039 A1 | 9/2002 | Majewski et al. | |
| 2002/0129140 A1 | 9/2002 | Peled et al. | |
| 2002/0129277 A1 | 9/2002 | Caccavale | |
| 2002/0133509 A1 | 9/2002 | Johnston et al. | |
| 2002/0133514 A1 * | 9/2002 | Bates et al. | 707/501.1 |
| 2002/0138621 A1 * | 9/2002 | Rutherford et al. | 709/227 |
| 2002/0144129 A1 | 10/2002 | Malivanchuk et al. | |
| 2002/0152284 A1 | 10/2002 | Cambray et al. | |
| 2002/0178374 A1 | 11/2002 | Swimmer et al. | |
| 2003/0005112 A1 | 1/2003 | Krautkremer | |
| 2003/0009495 A1 * | 1/2003 | Adjaoute | 707/501.1 |
| 2003/0023860 A1 | 1/2003 | Eatough et al. | |
| 2003/0074567 A1 | 4/2003 | Charbonneau | |
| 2003/0097617 A1 | 5/2003 | Goeller et al. | |
| 2003/0110168 A1 | 6/2003 | Kester et al. | |
| 2003/0120543 A1 * | 6/2003 | Carey | 705/14 |
| 2003/0126136 A1 | 7/2003 | Omoigui | |
| 2003/0126139 A1 | 7/2003 | Lee et al. | |
| 2003/0135611 A1 | 7/2003 | Kemp et al. | |
| 2003/0177187 A1 | 9/2003 | Levine et al. | |
| 2003/0177394 A1 | 9/2003 | Dozortsev | |
| 2003/0185399 A1 | 10/2003 | Ishiguro | |
| 2004/0003139 A1 | 1/2004 | Cottrille et al. | |
| 2004/0006621 A1 | 1/2004 | Bellinson et al. | |
| 2004/0015586 A1 | 1/2004 | Hegli et al. | |
| 2004/0019656 A1 | 1/2004 | Smith | |
| 2004/0034794 A1 | 2/2004 | Mayer et al. | |
| 2004/0049514 A1 * | 3/2004 | Burkov | 707/100 |
| 2004/0054713 A1 * | 3/2004 | Rignell et al. | 709/203 |
| 2004/0062106 A1 | 4/2004 | Ramesh et al. | |
| 2004/0068479 A1 | 4/2004 | Wolfson et al. | |

| | | | |
|---|---|---|---|
| 2004/0078591 A1 | 4/2004 | Teixeira et al. | |
| 2004/0107267 A1* | 6/2004 | Donker et al. | 709/218 |
| 2004/0111499 A1 | 6/2004 | Dobrowski et al. | |
| 2004/0123157 A1 | 6/2004 | Alagna et al. | |
| 2004/0128285 A1* | 7/2004 | Green et al. | 707/3 |
| 2004/0153644 A1 | 8/2004 | McCorkendale | |
| 2004/0167931 A1 | 8/2004 | Han | |
| 2004/0172389 A1* | 9/2004 | Galai et al. | 707/3 |
| 2004/0181788 A1 | 9/2004 | Kester et al. | |
| 2004/0220924 A1 | 11/2004 | Wootton | |
| 2005/0015626 A1 | 1/2005 | Chasin | |
| 2005/0033967 A1 | 2/2005 | Morino et al. | |
| 2005/0066197 A1 | 3/2005 | Hirata et al. | |
| 2005/0091535 A1 | 4/2005 | Kavalam et al. | |
| 2005/0131868 A1 | 6/2005 | Lin et al. | |
| 2005/0132042 A1 | 6/2005 | Cryer | |
| 2005/0132184 A1 | 6/2005 | Palliyil et al. | |
| 2005/0155012 A1 | 7/2005 | Tayama et al. | |
| 2005/0188036 A1* | 8/2005 | Yasuda | 709/206 |
| 2005/0210035 A1 | 9/2005 | Kester et al. | |
| 2005/0223001 A1 | 10/2005 | Kester et al. | |
| 2005/0235036 A1* | 10/2005 | Nielsen et al. | 709/206 |
| 2005/0251862 A1 | 11/2005 | Talvitie | |
| 2005/0262063 A1* | 11/2005 | Conboy et al. | 707/3 |
| 2006/0004636 A1 | 1/2006 | Kester et al. | |
| 2006/0004717 A1 | 1/2006 | Ramarathnam et al. | |
| 2006/0026105 A1 | 2/2006 | Endoh | |
| 2006/0031504 A1 | 2/2006 | Hegli et al. | |
| 2006/0036966 A1* | 2/2006 | Yevdayev | 715/779 |
| 2006/0053488 A1 | 3/2006 | Sinclair et al. | |
| 2006/0068755 A1 | 3/2006 | Shraim et al. | |
| 2006/0075072 A1 | 4/2006 | Sinclair et al. | |
| 2006/0075494 A1* | 4/2006 | Bertman et al. | 726/22 |
| 2006/0095404 A1 | 5/2006 | Adelman et al. | |
| 2006/0095459 A1 | 5/2006 | Adelman et al. | |
| 2006/0095586 A1 | 5/2006 | Adelman et al. | |
| 2006/0095779 A9* | 5/2006 | Bhat et al. | 713/182 |
| 2006/0095965 A1 | 5/2006 | Phillips et al. | |
| 2006/0101514 A1 | 5/2006 | Milener et al. | |
| 2006/0129644 A1 | 6/2006 | Owen et al. | |
| 2006/0184655 A1* | 8/2006 | Shalton | 709/223 |
| 2006/0265750 A1 | 11/2006 | Huddleston | |
| 2007/0005762 A1 | 1/2007 | Knox et al. | |
| 2007/0011739 A1 | 1/2007 | Zamir et al. | |
| 2007/0028302 A1 | 2/2007 | Brennan et al. | |
| 2007/0124388 A1 | 5/2007 | Thomas | |
| 2007/0156833 A1 | 7/2007 | Nikolov et al. | |
| 2007/0260602 A1 | 11/2007 | Taylor | |
| 2008/0016339 A1* | 1/2008 | Shukla | 713/164 |
| 2008/0027824 A1* | 1/2008 | Callaghan et al. | 705/26 |
| 2008/0077995 A1* | 3/2008 | Curnyn | 726/27 |
| 2008/0256187 A1* | 10/2008 | Kay | 709/206 |
| 2008/0267144 A1 | 10/2008 | Jano et al. | |
| 2008/0295177 A1 | 11/2008 | Dettinger et al. | |
| 2009/0064330 A1* | 3/2009 | Shraim et al. | 726/22 |

FOREIGN PATENT DOCUMENTS

| | | |
|---|---|---|
| EP | 0 748 095 | 12/1996 |
| EP | 1 278 330 | 1/2003 |
| EP | 1 280 040 | 1/2003 |
| EP | 1 318 468 | 6/2003 |
| EP | 1 329 117 | 7/2003 |
| EP | 1 457 885 | 9/2004 |
| EP | 1 494 409 | 1/2005 |
| EP | 1 510 945 | 3/2005 |
| GB | 2418330 | 3/2006 |
| JP | 10 243018 | 9/1998 |
| JP | 2000-235540 | 8/2000 |
| JP | 2002-358253 | 12/2002 |
| JP | 2003-050758 | 2/2003 |
| JP | 2004-013258 | 1/2004 |
| WO | WO 92/19054 | 10/1992 |
| WO | WO 96/05549 A1 | 2/1996 |
| WO | WO/9605549 A1 | 2/1996 |
| WO | WO 96/42041 | 12/1996 |
| WO | WO 01/33371 | 5/2001 |
| WO | WO 01/55873 | 8/2001 |
| WO | WO 01/55905 | 8/2001 |
| WO | WO 01/63835 | 8/2001 |
| WO | WO 2005/017708 | 2/2005 |
| WO | WO 2006/027590 | 3/2006 |
| WO | WO 2006/062546 | 6/2006 |
| WO | WO 2006/136605 | 12/2006 |

OTHER PUBLICATIONS

Cohen, F., A Cryptographic Checksum for Integrity Protection, Computers & Security, Elsevier Science Publishers, Dec. 1, 1987, vol. 6, Issue 6, pp. 505-510, Amsterdam, NL.

European Search Report for Application No. 02258462.7, Jan. 30, 2006.

Forte, M. et al., "A content classification and filtering server for the Internet", Applied Computing 2006. 21st Annual ACM Symposium on Applied Computing, [online] http://portal.acm.org/citation.cfm?id=1141553&coll=portal&dl=ACM&CFID=2181828&CFTOKEN=68827537> [retrieved on Dec. 7, 2007], Apr. 23, 2006-Apr. 27, 2006, pp. 1166-1171.

Gittler F., et al., The DCE Security Service, Pub: Hewlett-Packard Journal, Dec. 1995, pp. 41-48.

IBM Corp., Enforced Separation of Roles in a Multi-User Operating System, IBM Technical Disclosure Bulletin, Dec. 1991, Issue 34, pp. 120-122.

IBM Technical Disclosure Bulletin, Mean to Protect System from Virus, IBM Corp., Aug. 1, 1994, Issue 659-660.

Igakura, Tomohiro et al., Specific quality measurement and control of the service-oriented networking application., Technical Report of IEICE, IEICE Association, Jan. 18, 2002, vol. 101, Issue 563, pp. 51-56, Japan.

International Search Report and Written Opinion dated Jun. 30, 2008 for PCT Patent Application No. PCT/US2007/024557.

International Search Report and Written Opinion for PCT Application No. PCT/US2007/015730 dated Dec. 27, 2008, 16 pages.

International Search Report, International Application No. PCT/US2006/049149, Mailed Mar. 10, 2008, 4 pages.

Microsoft Press Computer Dictionary, 3rd edition, Pub: Microsoft Press, 1997, pp. 262, 276.

Molitor, Andrew, An Architecture for Advanced Packet Filtering, Proceedings for the Fifth Usenix Unix Security Symposium, Jun. 1995, pp. 1-11.

Newman, H., A Look at Some Popular Filtering Systems, Pub: Internet, Online!, Jul. 25, 1999, pp. 1-11.

PCT International Search Report and Written Opinion for corresponding International Application No. PCT/GB2005/002961, Oct. 19, 2005.

Reid, Open Systems Security: Traps and Pitfalls, Computer & Security, 1995, Issue 14, pp. 496-517.

Roberts-Witt, S., The 1999 Utility Guide: Corporate Filtering, Pub: PC Magazine Online, Apr. 5, 1999, pp. 1-11.

Sandhu, et al., Access Control: Principles and Practice, IEEE Communications Magazine, Sep. 1994, pp. 40-48.

Secure Computing Corporation, SmartFilter™ Web Tool, Dec. 1, 1998, pp. 1-2.

Sequel Technology, Inc., Sequel and Surfwatch Partner to Provide Innovative Internet Resource Management Tools for Large Enterprises, Pub: Internet, Online!, Feb. 25, 1999, pp. 1-3.

Snyder, J., A Flurry of Firewalls, www.opus1.com/www/jms/nw-firewall.html, Network World, Jan. 29, 1996, pp. 1-8.

Stein, Web Security—a step by step reference guide, Addison-Wesley, 1997, pp. 387-415.

Supplementary European Search Report for EPO App. No. 00 90 7078, May 18, 2004.

SurfControl PLC, SuperScout Web Filter Reviewer's Guide, 2002, pp. 36.

Surfcontrol, Project Nomad, http:www.surfcontrol.com/news/newsitem.aspx?id=593, Oct. 29, 2003.

SurfWatch Software, SurfWatch® Professional Edition: Product Overview, Pub: Internet, Online!, May 26, 1999, pp. 1.

Symantec Corporation, E-security begins with sound security policies, Announcement Symantec, XP002265695, Jun. 14, 2001, pp. 1,9.

Williams, R., Data Integrity with Veracity, Retrieved from the Internet: <URL: ftp://ftp.rocksoft.com/clients/rocksoft/papers/vercty10.ps>, Sep. 12, 1994.

Wobus, J., DHCP FAQ, www.nd.edu/~milind/FAQs/FAQ_dhcp, Dec. 29, 1995, pp. 1-10.

Yialelis, et al., Role-Based Security for Distributed Object Systems, Proceedings of the IEEE Fifty Workshops on Enabling Technology: Infrastructure for Collaborative Enterprises, WET ICE '96, Jun. 19, 1996-Jun. 21, 1996, pp. 6.

Supplementary European Search Report for EPO App. No. 00 90 7078, mailed May 18, 2004.

European Search Report for Application No. 02258462.7, mailed Jan. 30, 2006.

Sandhu, et al., Access Control: Principles and Practice, IEEE Communications Magazine, pp. 40-48, Sep. 1994.

C.L.Schuba and E.H. Spafford. Countering abuse of name-based authentication. In $22^{nd}$ Annual Telecommunications Policy Research Conference, 21 pp., 1996.

Surfcontrol plc, SuperScout Web Filter Reviewer's Guide, 36pp., 2002.

Yialelis, et al., Role-Based Security for Distributed Object Systems, Proceedings of the IEEE Fifty Workshops on Enabling Technology: Infrastructure for Collaborative Enterprises (WET ICE '96), 6pp., Jun. 19-21, 1996.

Roberts-Witt, S., The 1999 Utility Guide: Corporate Filtering, PC Magazine Online, Apr. 5, 1999, pp. 1-11.

Sequel Technology, Inc., Sequel and Surfwatch Partner to Provide Innovative Internet Resource Management Tools for Large Enterprises, Internet, Online!, Feb. 25, 1999, pp. 1-3.

SurfWatch Software, SurfWatch® Professional Edition: Product Overview, Internet, Online!, May 26, 1999, p. 1.

Newman, H., A Look at Some Popular Filtering Systems, Internet, Online!, Jul. 25, 1999, pp. 1-11.

Secure Computing Corporation, SmartFilter™ WebTool, Dec. 1, 1998, pp. 1-2.

Molitor, Andrew. "An Architecture for Advanced Packet Filtering", Jun. 1995 Proceedings of the Fifth USENIX UNIX Security Symposium, pp. 1-11.

Microsoft Press Computer Dictionary, $3^{rd}$ ed., Microsoft Press, pp. 262, 276, 1997.

Wobus, J., DHCP FAQ, www.nd.edu/~milind/FAQs/FAQ_dhcp, pp. 1-10, Dec. 29, 1995.

Gittler, F., et al., The DCE Security Service, Hewlett-Packard Journal, pp. 41-48, Dec. 1995.

Snyder, J., A Flurry of Firewalls, Network World, www.opus1.com/www/jms/nw-firewall.html, pp. 1-8, Jan. 29, 1996.

Hubbard, Dan, Websense Security Labs, The Web Vector: Exploiting Human and Browser Vulnerabilities, Toorcon 2005 (http://www.toorcon.org).

* cited by examiner

Logging Database

| No. Requests | URL | JavaScript? | ActiveX? |
|---|---|---|---|
| 9000 | www.gougle.com | Yes | Yes |
| 32 | www.amazon.com/specialoftheday | No | Yes |
| 2 | www.sportsweb.com | Yes | No |
| 1 | www.aasdfghd.com | No | No |

*FIG. 4*

URL Access Policy Database

| User | Category | Always block? | Allowed Times |
|---|---|---|---|
| asmith | Malicious | Yes | |
| bnguyen | Gambling | | 6pm – 8 am |
| clee | Spyware | Yes | |
| | Politics | | 6pm – 8 am |

*FIG. 5*

Categorized URLs — 146

| URL | Category |
|---|---|
| http://example1.com/abc | Malicious |
| http://example2.biz/abc | Gambling |
| http://example4.com/abc | Spyware |

Uncategorized URLs — 147

| URL |
|---|
| http://example5.com/abc |
| http://example6.biz/abc |
| http://example3.com/abc |

*FIG. 6B*

URL DATA COLLECTED BY COLLECTION SYSTEM

| IP ADDRESS | URL | PAGE_CONTENT | ACTIVE CONTENT? |
|---|---|---|---|
| 134.34.54.158 | www.gougle.com | BLOB | Yes |
| 152.68.94.129 | www.amazon.com/specialoftheday | BLOB | Yes |
| 10.42.228.233 | www.sportsweb.com | BLOB | No |
| 152.36.242.21 | www.aasdfghd.com | TEXT | No |
| 134.34.54.158 | www.gougle.com/page2.html | BLOB | Yes |

*FIG. 11*

SYSTEM AND METHOD OF ANALYZING WEB CONTENT

RELATED APPLICATIONS

This Application is related to U.S. patent application Ser. No. 11/484,335, filed on even date, which is hereby incorporated by reference in its entirety.

BACKGROUND OF THE INVENTION

1. Field of the Invention

This application relates to data and application security. In particular, this application discloses systems methods of collecting and mining data to determine whether the data includes malicious content.

2. Description of the Related Technology

Traditionally, computer viruses and other malicious content were most often provided to client computers by insertion of an infected diskette or some other physical media into the computer. As the use of e-mail and the Internet increased, e-mail attachments became a prevalent method for distributing virus code to computers. To infect the computer with these types of viruses having malicious content, some affirmative action was typically required by the user such as opening an infected file attachment or downloading an infected file from a web site and launching it on their computer. Over time, antivirus software makers developed increasingly effective programs designed to scan files and disinfect them before they had the opportunity to infect client computers. Thus, computer hackers were forced to create more clever and innovative ways to infect computers with their malicious code.

In today's increasingly-networked digital world, distributed applications are being developed to provide more and more functionality to users in an open, collaborative networking environment. While these applications are more powerful and sophisticated, their increased functionality requires that network servers interact with client computers in a more integrated manner. For example, where previous web applications primarily served HTML content to client browsers and received data back from the client via HTTP post commands, many new web applications are configured to send various forms of content to the client computer which cause applications to be launched within the enhanced features of newer web browsers. For example, many web-based applications now utilize Active-X controls which must be downloaded to the client computer so they may be effectively utilized. Java applets, VBScript and JavaScript commands also have the capability of modifying client computer files in certain instances.

The convenience that has arrived with these increases in functionality has not come without cost. Newer web applications and content are significantly more powerful than previous application environments. As a result, they also provide opportunities for malicious code to be downloaded to client computers. In addition, as the complexity of the operating system and web browsing applications increase, it becomes more difficult to identify security vulnerabilities which may allow hackers to transfer malicious code to client computers. Although browser and operating system vendors generally issue software updates to remedy these vulnerabilities, many users have not configured their computers to download these updates. Thus, hackers have begun to write malicious code and applications which utilize these vulnerabilities to download themselves to users' machines without relying on any particular activity of the user such as launching an infected file. One example of such an attack is the use of malicious code embedded into an active content object on a website. If the malicious code has been configured to exploit a vulnerability in the web browser, a user may be infected or harmed by the malicious code as a result of a mere visit to that page, as the content in the page will be executed on the user's computer.

An attempt to address the problem of malicious code embedded in content is to utilize heightened security settings on the web browser. However, in many corporate environments, intranet or extranet applications are configured to send executable content to client computers. Setting browser settings to a high security level tends to impede or obstruct the effective use of these types of "safe" applications. Another attempt to address the issue is to block all executable content using a network firewall application. This brute force approach also is ineffective in many environments, because selective access to certain types of content is necessary for software to correctly function.

What is needed is a system and method that allows for the detection of malicious web content without compromising user functionality. Further, what is needed is a system that can detect executable content and quickly identify and categorize its behavior, and provide protection from the malicious content to a high volume of client computers with minimum delay.

SUMMARY OF CERTAIN INVENTIVE EMBODIMENTS

The system, method, and devices of the present invention each have several aspects, no single one of which is solely responsible for its desirable attributes. Without limiting the scope of this invention, several of its features will now be discussed briefly.

In one embodiment, a computer-implemented method of identifying inappropriate content in web content is provided. The method includes receiving a request for a web content. The requested web content is compared to data in a database. If the requested content is not in the database, it is sent to a collection module which collects data related to the requested content. Based on the collected data, a candidate status for the URL is determined.

In another embodiment, a system for identifying candidate URLs from a set of uncategorized URLs is provided. The system may include a URL database configured to store the uncategorized URLs and a collection system configured to collect information about the uncategorized URLs including data-related to the uncategorized URLs. The collection system may include a data mining module configured to identify uncategorized URLs having a characteristic indicative of targeted content.

In yet another embodiment, a computer-implemented method of collecting data about URLs is provided. The method includes providing a data mining module with a configuration plug-in. The data mining module may have a plurality of dispatchers configured to operate independently of each other. The data mining module receives URL data for analysis, and separates the URL data into work units of URL strings. The method further provides for determining whether one of the plurality of dispatchers is available for receiving a work unit, and sending the URL to one of the dispatchers if it is available.

In yet another embodiment, a system for collecting data about URLs is provided. The system may include a database for storing information about URLs. The system may also include a pool of dispatchers which include asynchronous system processes each configured to receive URL data input and perform actions on the data. The system may also include a driver module configured to monitor the pool of dispatchers for available dispatchers, and send part of the URL data input to the available dispatchers.

In still another embodiment, a system for identifying candidate URLs from a set of uncategorized URLs include means for storing the uncategorized URLs, means for collecting information related to the uncategorized URLs, and means for identifying the uncategorized URLs having a characteristic indicative of targeted content.

BRIEF DESCRIPTION OF THE DRAWINGS

In this description, reference is made to the drawings wherein like parts are designated with like numerals throughout.

FIG. 4 is an example of a logging database.

FIG. 5 is an example of a URL Access Policy database table.

FIGS. 6A and 6B are examples of categorized and uncategorized URLs, respectively.

FIG. 11 is an example of URL-related data collected by the collection module from FIG. 9.

DETAILED DESCRIPTION OF CERTAIN INVENTIVE EMBODIMENTS

Certain embodiments provide for systems and method of identifying and categorizing web content, including potentially executable web content and malicious content, that is found at locations identified by Uniform Resource Locators (URLs). As used herein, potentially executable web content generally refers to any type of content that includes instructions that are executed by a web browser or web client computer. Potentially executable web content may include, for example, applets, executable code embedded in HTML or other hypertext documents (including script languages such as JavaScript or VBScript), executable code embedded in other documents, such as Microsoft Word macros, or stylesheets. Potentially executable web content may also refer to documents that execute code in another location such as another web page, another computer, or on the web browser computer itself. For example, a HTML web page that includes an "OBJECT" element, and thus can cause execution of ActiveX or other executable components, may generally be considered potentially executable web content regardless of the location of the executable components. Malicious content may refer to content that is not executable but which is calculated to exploit a vulnerability on a client computer. However, potentially executable web content may also be malicious content. For example, image files have been used to exploit vulnerabilities in certain operating systems when those images are processed for display. Moreover, malicious web content may also refer to interactive content such as "phishing" schemes in which a HTML form or other web content is designed to appear to be provided by another, typically trusted, web site such as a bank, in order to deceive the user into providing credentials or other sensitive information to an unauthorized party.

Figure 1:
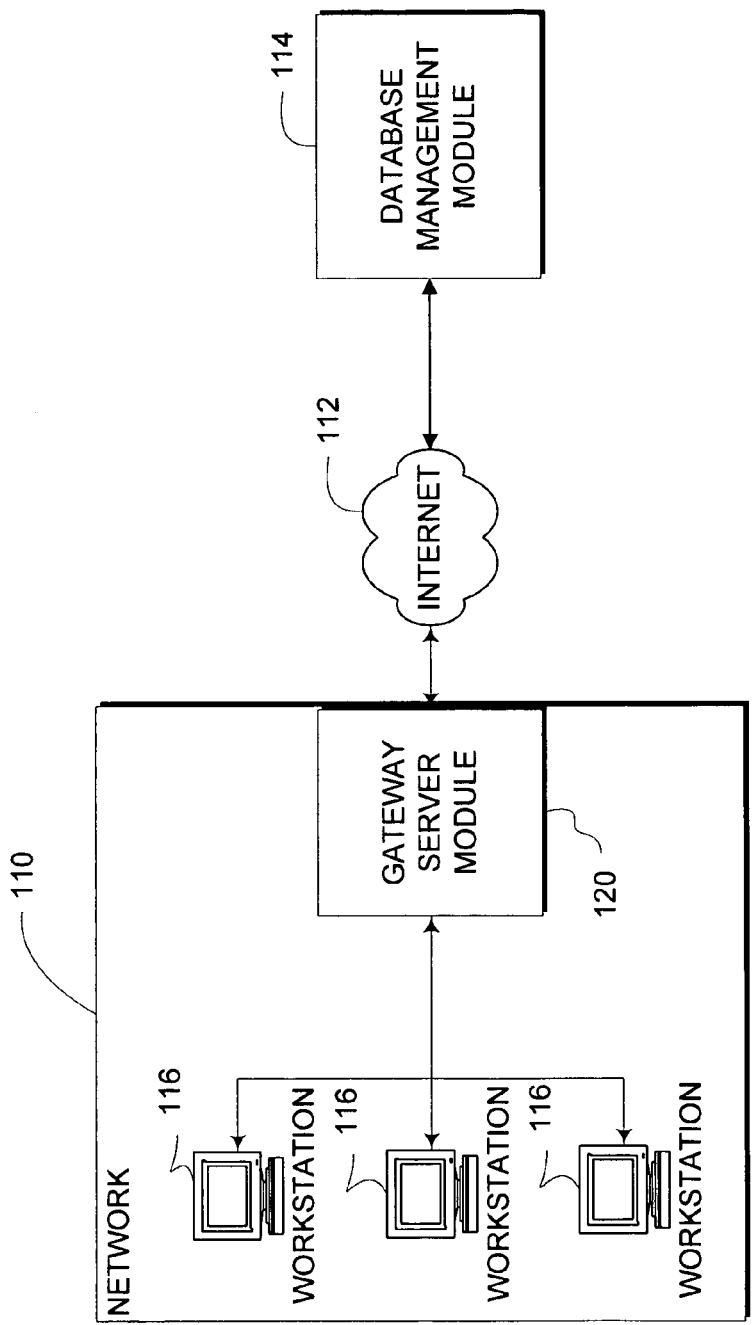
FIG. 1 is a block diagram of various components of a system in accordance with aspects of the invention.

FIG. 1 provides a top level illustration of an exemplary system. The system includes a network 110. The network 110 may be a local area network, a wide area network, or some other type of network. The network 110 may include one or more workstations 116. The workstations 116 may be various types of client computers that are attached to the network. The client computers 116 may be desktop computers, notebook computers, handheld computers or the like. The client computers may also be loaded with operating systems that allow them to utilize the network through various software modules such as web browsers, e-mail programs, or the like.

Each of the workstations 116 may be in electrical communication with a gateway server module 120. The gateway server module may reside at the edge of the network 110 so that traffic sent to and from the Internet 112 may pass through it on its way into or out of the network 110. The gateway server module 112 may take the form of a software module that is installed on a server that stands as a gateway to a wider area network 112 than the network 110 to which the workstations 116 are directly attached. Also connected to the Internet 112 is a database management module 114. The database management module also may be a software module (or one or more hardware appliances) which resides on one or more computing devices. The database management module 114 may reside on a machine that includes some sort of network connecting hardware, such as a network interface card, which allows the database management module 114 to send and receive data and information to and from the Internet 112.

Figure 2:
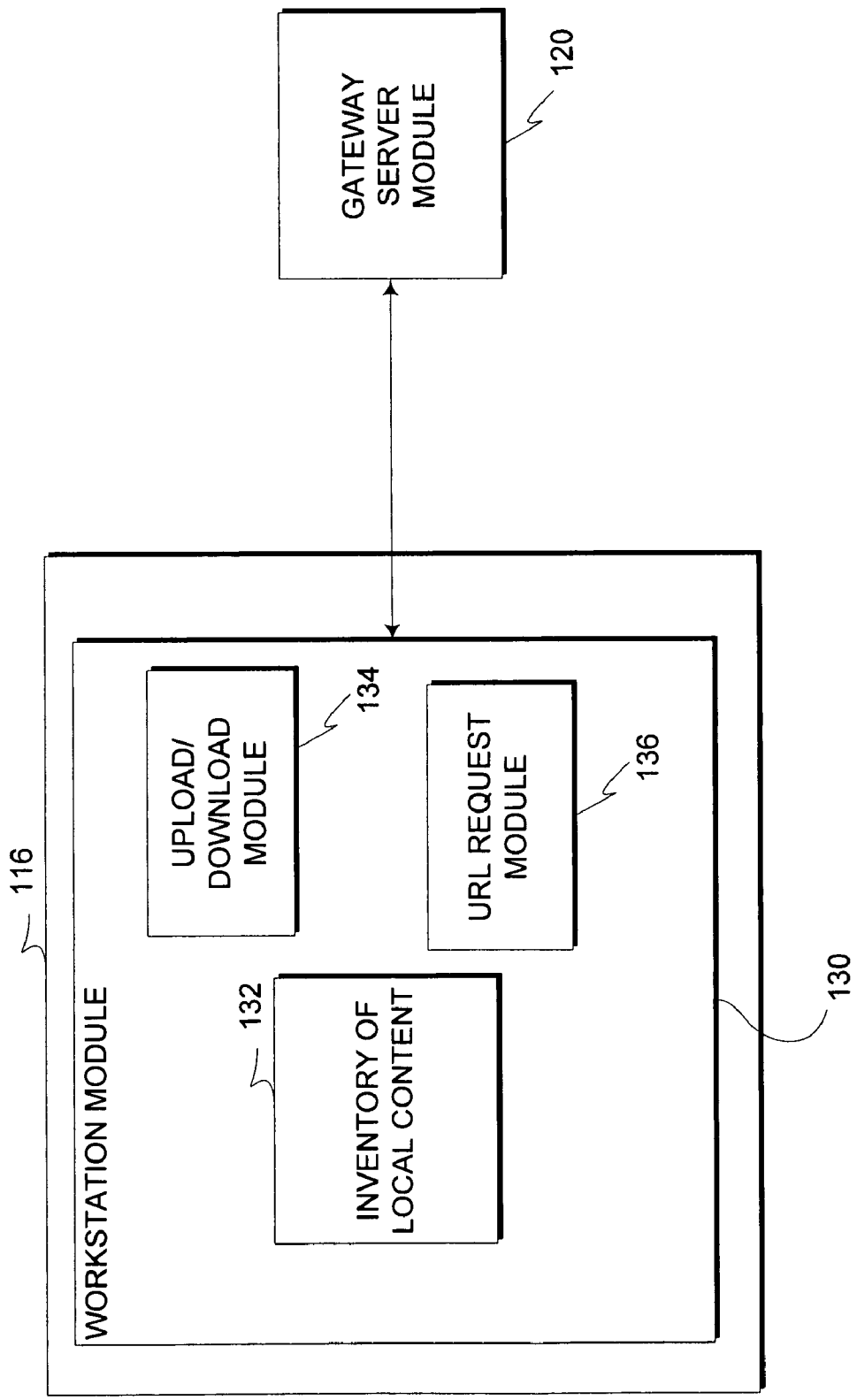
FIG. 2 is a block diagram of a workstation module from FIG. 1.

Referring now to FIG. 2, a more detailed view of the workstation 116 is presented. The workstation 116 may include a workstation module 130. The workstation module 130 may take the form of software installed to run on the operating system of the workstation 116. Alternatively, the workstation module 130 could be an application running on another machine that is launched remotely by the workstation 116.

The workstation module 130 may include various components. The workstation module may include an inventory of a local active content module 132 which records all web content stored on the workstation 116. For example, the local content inventory module 132 may periodically inventory all local content. The inventoried data may be uploaded to the gateway server module 120 for comparison to the categorized URL/content database 146. The local content inventory module 132 may determine whether new content is being introduced to the workstation 116 by comparison to the inventoried local content 132.

The workstation module also may include an upload/download module 134 and a URL request module 136. The upload/download module 134 may be used to send and receive data from the network 110, through the gateway server module 120 and to the Internet 112. The URL request module 136 receives a URL input from either a user or some system process, and may send a request via the gateway server module 120 to retrieve the file and/or content associated with that URL. Typically, the functions of each of the upload/download module 134 and the URL request module 136 may be performed by a software applications such as web browsers, with Internet Explorer®, Mozilla Firefox, Opera, Safari, being examples of browsing software well-known in the art. Alternatively, the functions of the modules may be divided among different software applications. For example, an FTP application may perform the functions of the upload/download module 134, while a web browser my perform URL requests. Other types of software may also perform the functions of the upload/download module 134. Although these types of software are generally not desirable on a workstation, software such as Spyware, or Trojan Horses may make requests to send and receive data from the Internet.

Figure 3:
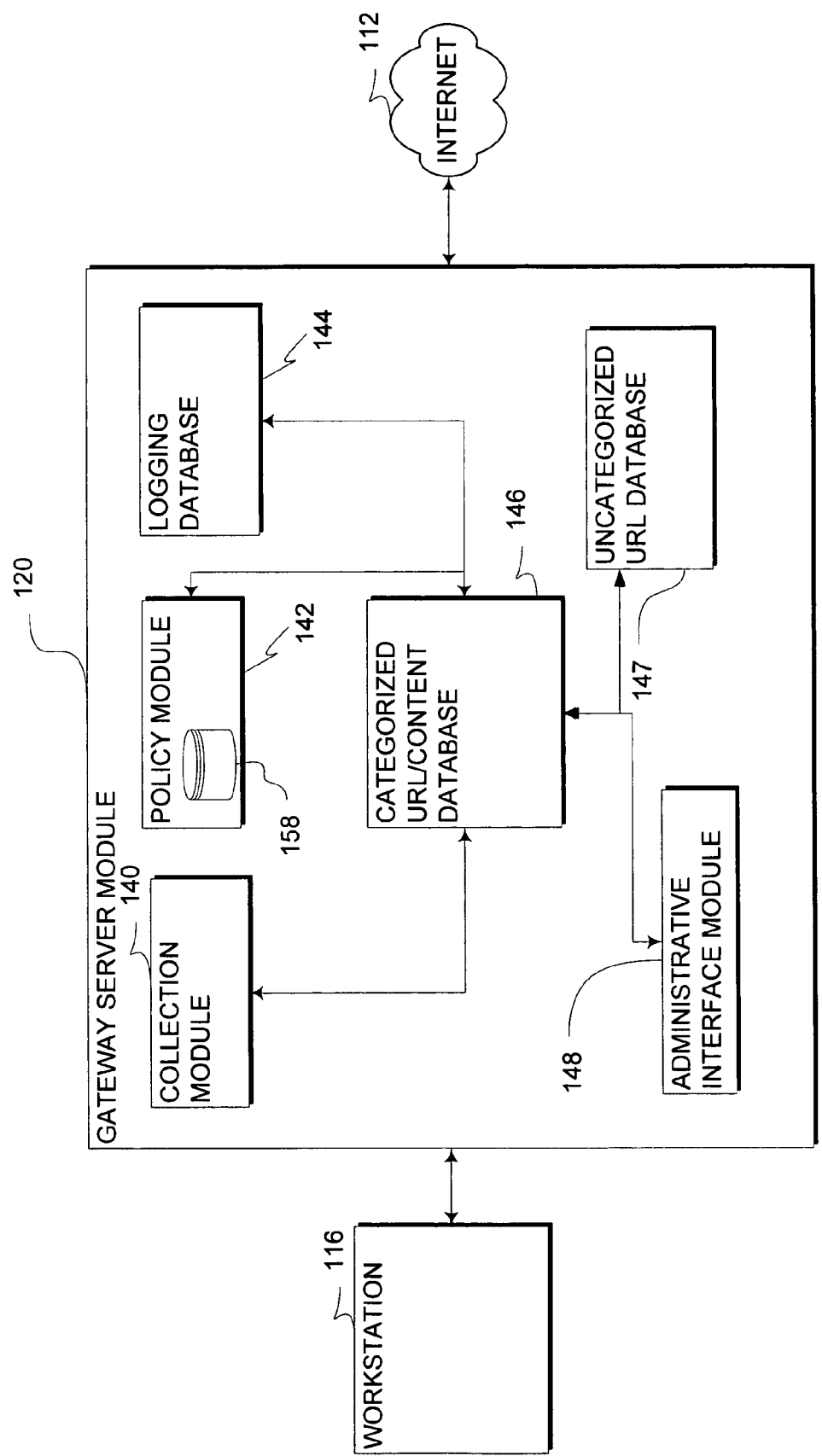
FIG. 3 is a block diagram of a gateway server module from FIG. 1.

The workstation module 130 may be in communication with the gateway server module 120. The gateway server module 120 may be used to analyze incoming and outgoing web traffic and to make various determinations about the impact the traffic may have on the workstations 116. Referring now to FIG. 3, an example of the gateway server module 120 is provided. The gateway server module 120 is in two way communication with the workstation 116. It may receive file uploads and downloads and URL requests from the workstation module 130. The gateway server module 120 is also in two way communication with the Internet 112. Thus, requests originating within the workstations 116 of the network 110 may be required to pass through the gateway server module 120 as they proceed to the Internet. In some embodiments, the gateway server module 120 may be integrated with some firewall hardware or software that protects the network 110 from unauthorized intrusions from the Internet 112. In other embodiments, the gateway server module 120 may be a standalone hardware appliance or even a software module installed on a separate gateway server residing at the network gateway to the Internet 112.

As discussed above, the gateway server module 120 may receive URL requests and upload/download data from the workstation 116 by way of the workstation module 130. The gateway server module 120 may include various components that perform various functions based on the data received.

One feature included in the gateway server module 120 is a categorized URL database 146. The URL database 146 may be used to store information about URLs including data that is associated with the URLs. The categorized URL database 146 may be a relational database, or it may be stored in some other form such as a flat file, an object-oriented database, and may be accessed via an application programming interface (API), or some database management software (DBMS). The URL database 146 may generally be used to help determine whether URL requests sent by the URL request module 136 will be permitted to be completed. In one embodiment, the URLs stored in the URL database 146 are categorized.

The gateway server module 120 may also include a policy module 142. The policy module 142 may used to implement network policies regarding how certain content will be handled by the gateway server module 120 or by a firewall or some other security software installed within the network 110. In one embodiment, the policy module 142 may be configured to provide the system guidance on how to handle URL requests for categorized URLs. For example, the gateway server module 120 may be configured to disallow URL requests that are categorized as being "Malicious" or "Spyware." In other embodiments, the policy module 142 may be used to determine how to handle URL requests that have not been categorized. In one embodiment, the system may be configured to block all requests for URLs that are not in the categorized URL database 146. The policy module 142 may also be configured to allow certain requests of uncategorized URLs based on the user making the request or the time at which the request is made. This allows the system to avoid having a one-size-fits-all configuration when such as configuration would not meet the business needs of the organization running the gateway server module 120.

The gateway server module 120 may include a collection module 140. The collection module 140 may be a software program, routine, or process that is used to collect data about URLs. In one embodiment, when a request for a particular URL is received from the URL request module 136, the collection module 140 may be configured to visit the URL and download the page data to the gateway server module 120 for analysis by components of the gateway server module 120. The downloaded data may also be sent via the Internet 112 for delivery to the database management module 114 (as will be discussed in further detail below).

In some embodiments, the gateway server module 120 may also include a logging database 144. The logging database 144 may perform various functions. For example, it may store records of certain types of occurrences within the network 110. In one embodiment, the logging database 144 may be configured to record each event in which an uncategorized URL is requested by a workstation 116. In some embodiments, the logging database 144 may also be configured to record the frequency with which a particular uncategorized URL is requested. This information may be useful in determining whether an uncategorized URL should be of particular importance or priority and should be categorized by the database management module 114 ahead of earlier received data. In some embodiments, uncategorized URLs may be stored separately in an uncategorized URL database 147.

For example, some spyware may be written to request data from a particular URL. If many workstations 116 within the network 110 are infected with the spyware, repeated requests to a particular URL may provide an indication that some anomaly is present within the network. The logging database may also be configured to record requests of categorized URL data. In some embodiments, categorizing requests of categorized URLs may be helpful in determining whether a particular URL has been mischaracterized.

Referring now to FIG. 4, an example of the logging database 144 is discussed. The logging database 144 includes four columns of data. The first column, "No. Page Requests" 152 is indicative of the number of times a particular URL has been requested by users within the network 110. The second column "URL" 154 records the particular URL string that is being logged in the logging database 144. Thus, when a URL is sent to the logging database 144, the database may first be searched to determine whether the URL string is already in it. If not, then the URL string may be added to the database. In some embodiments, the collection module 140 may be configured to visit the requested URL and gather data about the URL. The collection module 140 may retrieve the page source of the requested URL and scan it for certain keywords that may indicate a type of content. For example, if the page source includes "javascript://" then the page may be identified as having JavaScript. While such content is not inherently dangerous, a web page with JavaScript may have a greater chance of including malicious content designed to exploit how a browser application handles JavaScript function calls. In some embodiments, this data may be stored in the logging database 144 in JavaScript column 155. The logging database may also receive similar information from pages that include Active-X content and store that content within Active X column 156. In other embodiments, other types of content may be detected and stored for java applets, VBScript, and the like.

Referring again to FIG. 3, the gateway server module 120 may further include an administrative interface module 148 or "admin module." The admin module 148 may be used to allow network administrators or other technical personnel within an organization to configure various features of the gateway server module 120. In certain embodiments, the admin module 148 allows the network administrator or some other network management-type to configure the policy module 142.

Referring now to FIG. 5, an example of a URL access policy database 158 is provided. The URL access policy database 158 may be used by the policy module 142 to implement policies for accessing web-based content by workstations 116 within the network 110. In the embodiment shown the URL access policy database 158 includes a table with four columns. The first column is a user column 160. The "User" column 160 includes data about the users that are subject the policy defined in a given row of the table. The next column, "Category" 162, lists the category of content to which the policy defined by that row is applicable. The third column, "Always Block" 164 represents the behavior or policy that is implemented by the system when the user and category 166 of requested content match the user and category as defined in that particular row. In one embodiment, the "Always Block" field may be a Boolean-type field in which the data may be set to either true or false. Thus, in the first row shown in the data table, the policy module 142 is configured to "always block" requests for "malicious content" by user "asmith."

As noted above, the policy module may also be configured to implement policies based on different times. In the embodiment provided in FIG. 5, the fourth column "Allowed Times" 166 provides this functionality. The second row of data provides an example of how time policies are implemented. The user 164 is set to "bnguyen" and the category 162 is "gambling." The policy is not configured to "always block" gambling content for "bnguyen," as indicated by the field being left blank. However, the time during which these URL requests are permitted is limited to from 6 PM to 8 AM. Thus, adopting these types of policies allows network administrators to provide a certain degree of flexibility to workstations and users, but to do so in a way that network traffic is not compromised during typical working hours.

FIGS. 6A and 6B provide illustrations of how the categorized URL database 146 may store categorized data. In one embodiment, the categorized URLs may be stored in a two-column database table such as the one shown in FIG. 6A. In one embodiment, the table may include a URL column 172 which may simply store the URL string that has been characterized. The Category column 174 may store data about the how that URL has been characterized by database module 114 (as will be described in detail below). In one embodiment, the URL field may be indexed so that it may be more quickly searched in real time. Because the list of categorized URLs may reached well into the millions of URLs, a fast access routine is beneficial.

Referring now to FIG. 6B, the table of uncategorized URLs 147 is provided (described earlier in connection with FIG. 3). This table may be populated by URL requests from the workstation 116 which request URLs that are not present in the categorized URL table 146. As will be described in greater detail below, the gateway server module 120 may be configured to query the categorized URL database 146 to determine whether a requested URL should be blocked. If the requested URL is in the categorized database 146 the policy module may determine whether to allow the request to proceed to the internet 112. If the requested URL is not found in the categorized URL database, however, it may be added to the list of uncategorized URLs 176 so that it may be sent to the database management module 114 via the Internet 112 and later analyzed and categorized and downloaded into the database of categorized URLs 146.

Figure 7:
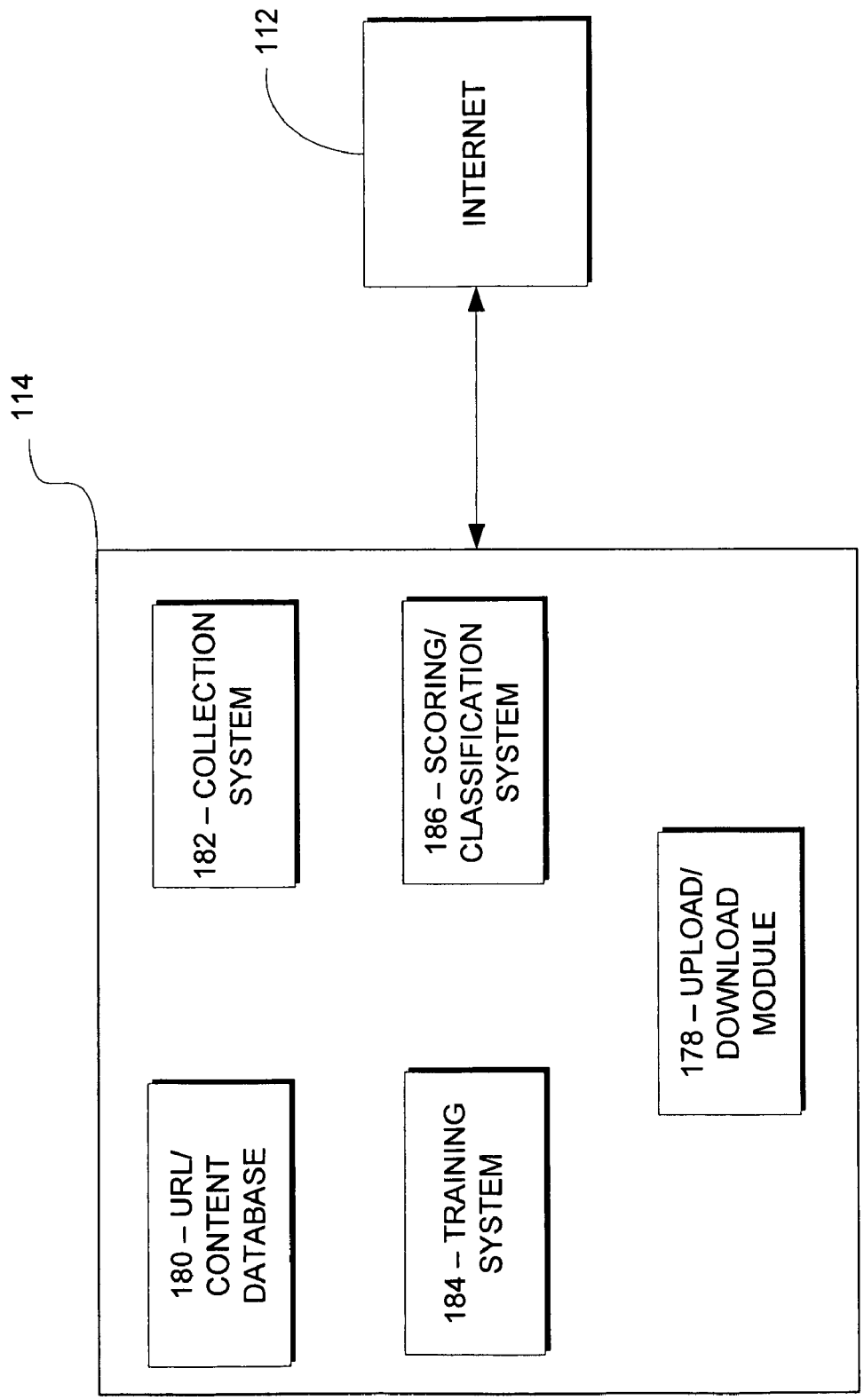
FIG. 7. is a block diagram of a database management module from FIG. 1.

FIG. 7 is an illustration of various components that may be included in the database management module 114. As discussed above, the database management module 114 may be located remotely (accessible via Internet 112) from the network 110 and its associated workstations 116. The database management module may take the form of one or many different hardware and software components such as a server bank that runs hundreds of servers simultaneously to achieve improved performance.

In one embodiment, the database management module 114 may include an upload/download module 178. The upload/download module 178 may be a software or hardware component that allows the database management module 114 to send and receive data from the Internet 112 to any number of locations. In one embodiment, the upload/download module is configured to send newly categorized URLs to gateway server modules 120 on the Internet 112 for addition to their local URL databases 146.

The database management module 114 may also include a URL/content database 180. The URL/content database 180 may take the form of a data warehouse which stores URL strings and information about URLs that have been collected by the collection system 182. The URL/content database 180 may be a relational database that is indexed to provide quick and effective searches for data. In certain embodiments, the URL database may be a data warehousing application which spans numerous physical hardware components and storage media. The URL database may include data such as URL strings, the content associated with those strings, information about how the content was gathered (e.g., by a honey client, by a customer submission, etc.), and possibly the date in which the URL was written into the URL/content database 180.

The database management module 114 may further include a training system 184. The training system 184 may be a software/hardware module which is used to define properties and definitions that may be used to categorize web-based content. The database management module 114 may further provide a scoring/classification system 186 which utilizes the definitions and properties created by the training system 184 to provide a score or classification (e.g., a categorization) to web content so that the categorization may be delivered via the upload/download module 178 to gateway server modules 120.

Figure 8:
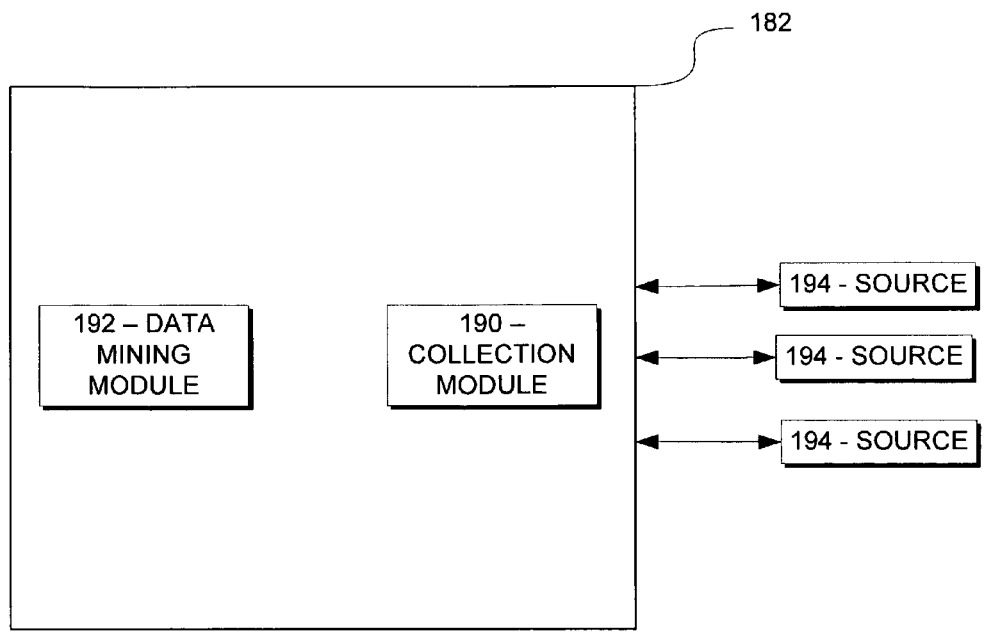
FIG. 8 is a block diagram of a collection system from FIG. 7.

With reference now to FIG. 8, a more detailed view of the collection system 182 is provided. The collection system 182 may include a collection module 190 which is coupled (either directly or indirectly) to a data mining module 192. The collection module 190 may be used by the database management module 114 to collect data for the URL/content database 180 about URLs that have not been categorized. The collection module may also be used to collect URLs for additional analysis by other system components. The collection module 190 may be associated with one or more collection sources 194 from which it may collect data about URLs. Collection sources may take various forms. In some embodiments, the collection sources 194 may include active and passive honeypots and honey clients, data analysis of logging databases 144 stored on gateway server module 120 to identify applications, URLs and protocols for collection. The collection sources may also be webcrawling applications that search the Internet 112 for particular keywords or search phrases within page content. The collection sources 194 may also include URLs and IP addresses data mined from a DNS database to identify domains that are associated with known malicious IP addresses. In some embodiments, URLs for categorization may be collected by receiving malicious code and malicious URL samples from other organizations who share this information. In yet other embodiments, URLs may be collected via e-mail modules configured to receive tips from the public at large, much in the way that criminals are identified through criminal tip hotlines.

Figure 9:
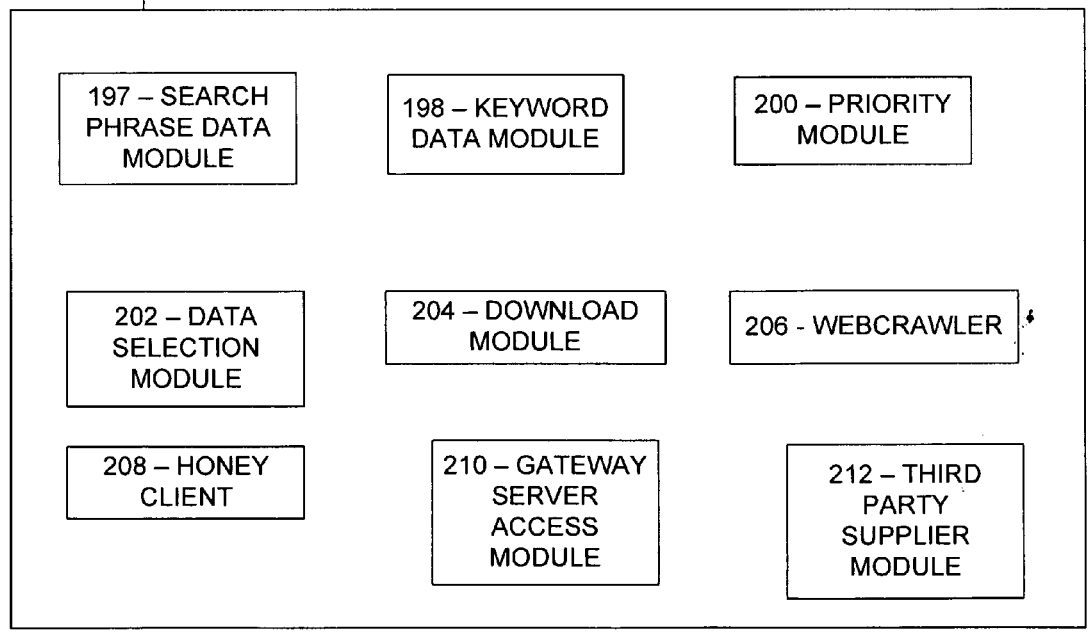
FIG. 9 is a block diagram of a collection module from FIG. 8.

Referring now to FIG. 9, a more detailed view of the collection module 190 is provided. The collection module 190 may include various subcomponents that allow it to effectively utilize each of the collection sources described above. The collection module 190 may include a search phrase data module 197 and a expression data module 198. The search phrase data module 197 collects and provides search phrases that may be relevant to identifying inappropriate content. The expression data module 198 may include various types of expressions such as regular expressions, operands, or some other expression. The search phrase data module 197 and the expression data module 198 each may include updatable record sets that may be used to define the search parameters for the web crawling collection source 194. The collection module 190 may also include a priority module 200. The priority module 200 may take the form of a software process running within the collection system 182, or it may run as a separate process. The priority module may be used to prioritize the data collected by the collection module in order to have more potentially dangerous or suspect URLs (or data) receive close inspection prior to the likely harmless URLs. In one embodiment, the priority module 200 may assign priority based on the collection source 194 from which the URL is received. For example, if a URL is received from a customer report, it may be designated with a higher priority. Similarly, if the URL is received from a web crawler accessing a domain or IP address or subnet known to host malicious content in the past, the URL may receive a high priority. Similarly, a potentially dangerous website identified by a honey client (discussed in further detail below) may also receive a high priority. The collection module 190 may also include a data selection module 202 which may work with the priority module 200 to determine whether identified URLs should be tagged as candidate URLs for categorization. In one embodiment, the data selection URL may provide a user interface for receiving search parameters to further refine the prioritized data by searching for data based on priority and content.

As indicated above, the collection module may also include a data download module 204. The data download module 204 may be configured to identify URLs to visit and to download data and content from the visited URLs. The data download module may work in conjunction with various subsystems in the collection module to retrieve data for the URL/content database 180. One such subsystem is the webcrawler module 206. The webcrawler module 206 may be a software application configured to access websites on the Internet 112 by accessing web pages and following hyperlinks that are included in those pages. The webcrawler module 206 may be configured with several concurrent processes that allow the module to simultaneously crawl many websites and report the visited URLs back to the URL/content database 180 as will be discussed in further detail below. The collection module 190 may also include a honey client module 208. The honey client module 208 is a software process configured to mimic the behavior of a web browser to visit websites in such a manner that is inviting to malicious code stored within the visited pages. The honey client module 208 may visit the web sites and track the behavior of the websites and download the content back to the URL/content database 180 for further analysis.

The download module 204 may also include a third party supplier module 212 which is configured to receive URLs and associated content from third parties. For example, the third party module 212 may be configured to provide a website which may be accessed by the general public. The module may be configured to receive an input URL string which may then be entered into the URL/content database 180. In some embodiments, the third party module may also be configured to receive e-mails from private or public mailing lists, and to identify any URL data embedded within the e-mails for storage in the URL/content database 180.

The download module may also include a gateway server access module 210. The gateway server access module is a software component or program that may be configured to regularly access the logging database 144 on the gateway server module 120 to download/upload all of the newly uncategorized web content identified by the logging database 144.

Referring back to FIG. 8, the collection system may also include a data mining module 192. The data mining module 192 may be used to obtain additional data about URLs stored in the URL/content database 180. In many instances, the information supplied by the collection sources 194 to the collection module 190 and URL/content database 180 is limited to nothing more than a URL string. Thus, in order for the system to effectively categorize the content within that URL, more data may be necessary. For example, the actual page content may need to be examined in order to determine whether there is dangerous content embedded within the URL. The data mining module 192 is used to collect this additional necessary data about the URLs, and will be discussed in further detail below.

Figure 10:
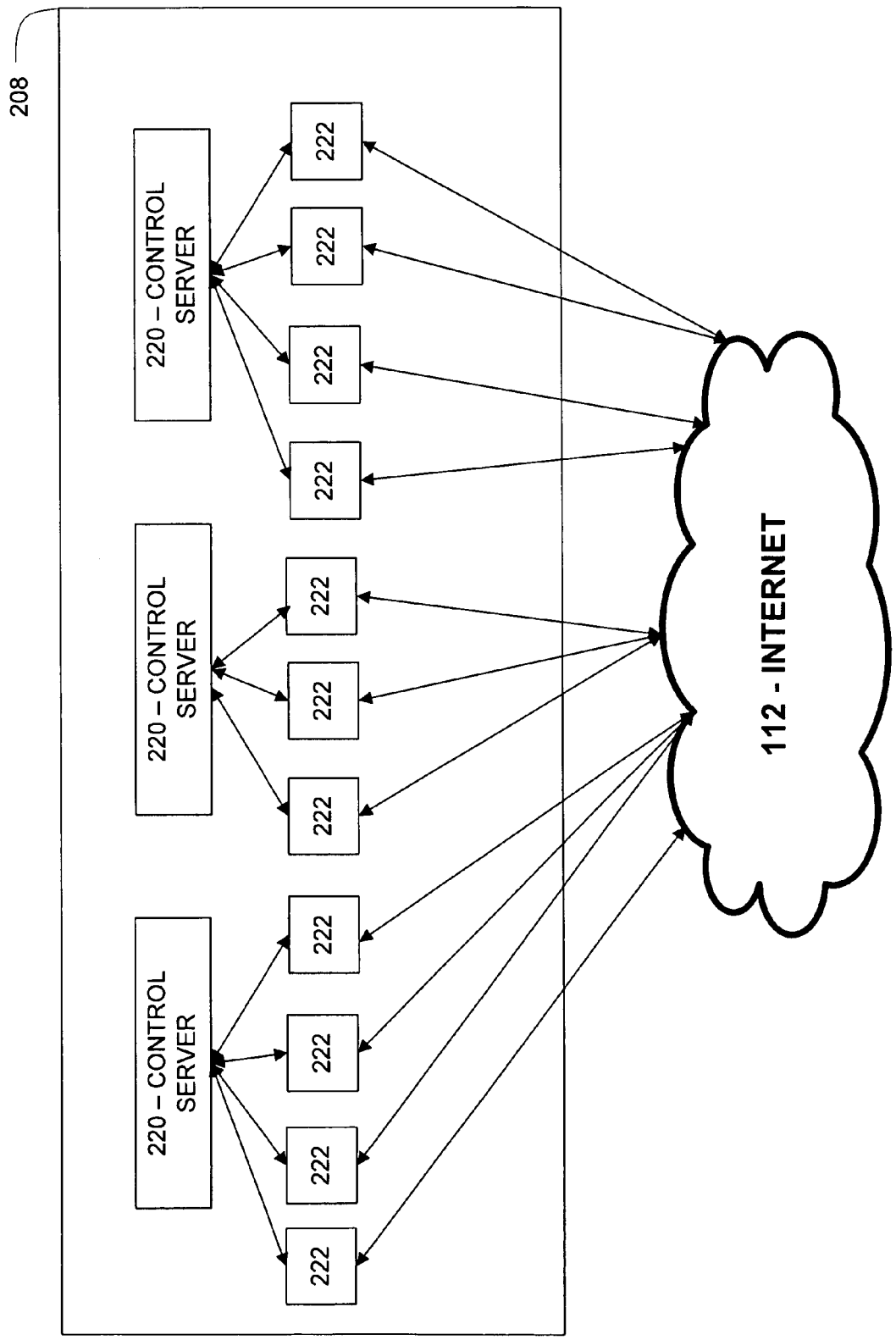
FIG. 10 shows a honey client system according to some aspects of the invention.

FIG. 10 provides a more detailed view of a honey client system 208. The honey client system 208 includes control servers 220. The control servers 220 are used to control a plurality of honey miners 222 which are configured to visit web sites and mimic human browser behavior in an attempt to detect malicious code on the websites. The honey miners 222 may be passive honey miners or active honey miners. A passive honey miner is similar to a web crawler as described above. However, unlike the web crawler above which merely visits the website and reports the URL links available from that site, the passive honey miners may be configured to download the page content and return it to the control servers 220 for insertion into the URL/content database 180 or into some other database. The honey miners 222 may be software modules on a single machine, or alternately, they may be implemented each on a separate computing device.

In one embodiment, each control server may control 16 passive honey miners 222. The control servers 220 may extract or receive URLs from the URL/content database 180 which need additional information in order to be fully analyzed or categorized. The control servers 220 provide the URLs to the miners which in turn review the URLs and store the collected data. When a passive miner 222 is finished with a particular URL, it may request another URL from its control server 222. In some embodiments, the miners 222 may be configured to follow links on the URL content so that in addition to visiting URLs specified by the control server 220, the miners may visit content that it linked to those URLs. In some embodiments, the miners 222 may be configured to mine to a specified depth with respect to each original URL. For example, the miners 222 may be configured to mine down through four layers of web content before requesting new URL data from the control server 220.

In other embodiments, the control servers 220 may be configured to control active honey miners 222. In contrast to the passive honey miners which only visit web sites and store the content presented on the sites, the active honey miners 222 may be configured to visit URLs and run or execute the content identified on the sites. In some embodiments, the active honey miners 222 include web browsing software that is configured to visit websites and access content on the websites via the browser software. The control server 220 (or the honey miners themselves 222) may be configured to monitor the characteristics of the honey miners 222 as they execute the content on the websites they visit. In one embodiment, the control server 220 will record the URLs that are visited by the honey miners as a result of executing an application or content on the websites visited. Thus, active honey miners 222 may provide a way to more accurately track system behavior and discover previously unidentified exploits. Because the active honey miners expose themselves to the dangers of executable content, in some embodiments, the active honey miners 222 may be located within a sandbox environment, which provides a tightly-controlled set of resources for guest programs to run in, in order to protect the other computers from damage that could be inflicted by malicious content. In some embodiments, the sandbox may take the form of a virtual machine emulating an operating system. In other embodiments, the sandbox may take the form of actual systems that are isolated from the network. Anomalous behavior may be detected by tracking in real-time, changes made to the file system on the sandbox machine. In some embodiments, the code executed by the active honey miners 222 may cause the machine on which they are running to become inoperable due to malicious code embedded in the webpage content. In order to address this issue, the control server may control a replacement miner which may step in to complete the work of a honey miner 222 which is damaged during the mining process.

Referring now to FIG. 11, an example of a set of URL-related data that has been collected by the collection system is provided. Although a particular example of collected data is provided, one of skill in the art will appreciate that other data might be collected in addition to the data provided in this example. Included in the collected data is an IP address 230 for the URL. The IP address 230 may be used to identify websites that are hosting multiple domains of questionable content under the same IP address or on the same server. Thus, if a URL having malicious content is identified as coming from a particular IP address, the rest of the data in the URL/content database 180 may be mined for other URLs having the same IP address in order to select them and more carefully analyze them. The collected URL data may also include a URL 232 as indicated by the second column in FIG. 11. In instances where the data is collected using a mining process such as the honey client process described above, the URL 232 may often include various pages from the same web domains, as the miners may have been configured to crawl through the links in the websites. The collected data may also include the page content 234 for a particular URL. Because the content of a URL may be in the form of graphics, text, applications and/or other content, in some embodiments, the database storing this URL data may be configured to store the page content as a binary large object (blob) or application objects in the data record. However, as some web pages contain text exclusively, the page content 234 may be stored as text as well. In some embodiments, the collection routine may be configured to determine whether the URL contains executable content. In these instances, the resultant data set of collected data may include an indication of whether the URL has executable content 236 within its page code. This information may be later used in selecting data from the URL/content database 180 has candidate data for analysis.

Figure 12:
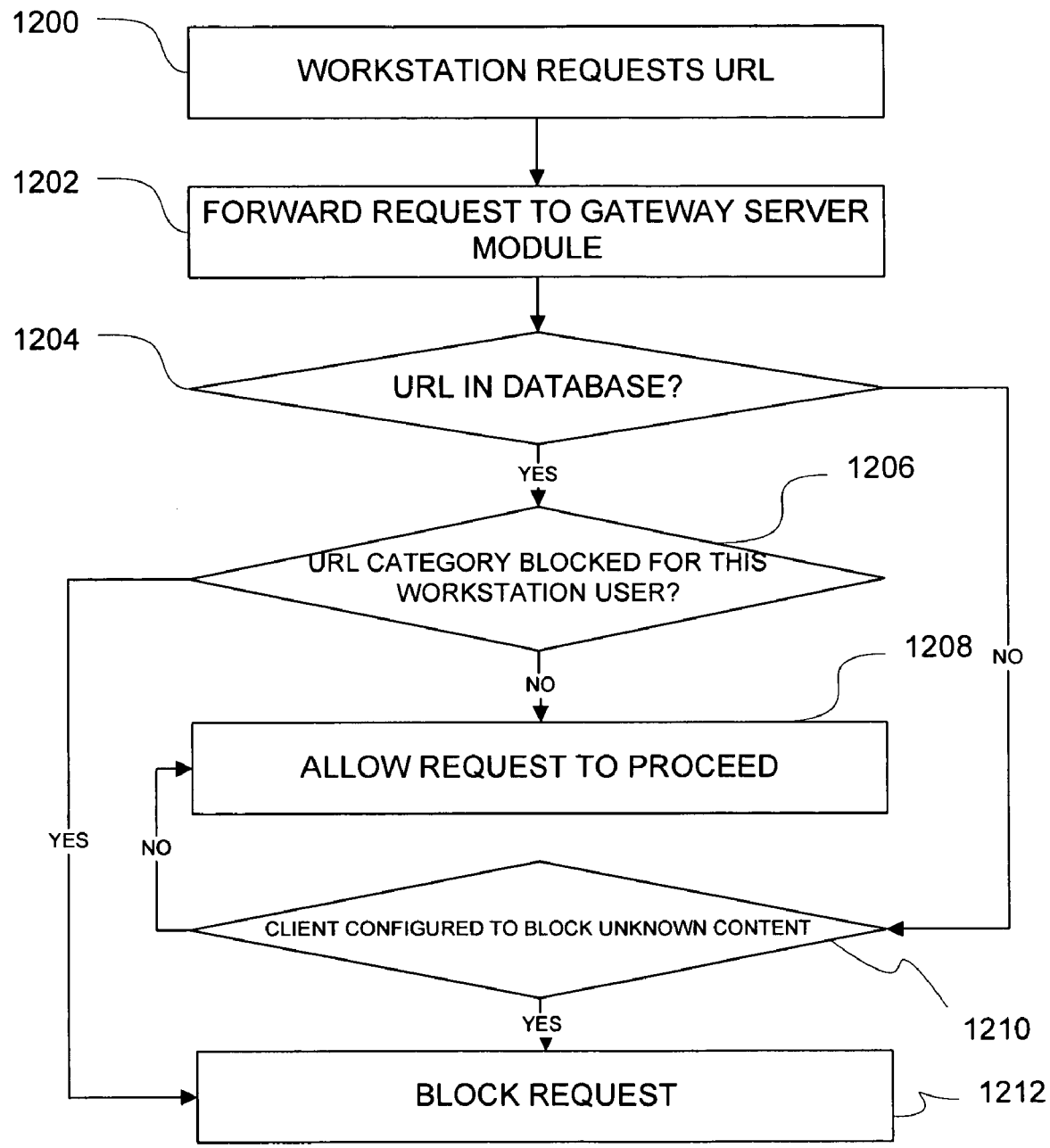
FIG. 12 is a flowchart describing how URLs may be handled in the gateway server module in one embodiment.

As discussed above in connection with FIG. 3, in some embodiments, the gateway server module 120 may be configured to control access to certain URLs based on data stored in the categorized URL database 146. FIG. 12 is a flowchart describing an embodiment in which the gateway server module handles a request from a workstation 116.

At block 1200, the workstation 116 requests a URL from the Internet 112. This request is intercepted at the Internet gateway and forwarded to the gateway server module 120 at block 1202. At block 1204, the categorized URL database 146 is queried to determine if the requested URL is stored in the database 146. If the requested URL is found as a record in the database, the process moves on to block 1206, where it analyzes the URL record to determine whether the category of the URL is one that should be blocked for the workstation user. If the category is blocked, the process skips to block 1212 and the request is blocked. If the category is not blocked, however, the request is allowed at block 1208.

If the requested URL is not found as a record in the categorized URL database 146 at block 1204, the system proceeds to block 1210. At block 1210, the system determines how to handle the uncategorized content. In some embodiments, the system may utilize the policy module 142 to make this determination. If the gateway server module 120 is configured to block requests for uncategorized content, the process moves to block 1212, and the request is blocked. If, on the other hand, the module is configured to allow these types of uncategorized requests, the process moves to block 1208, where the request is allowed to proceed to the Internet 112.

Figure 13:
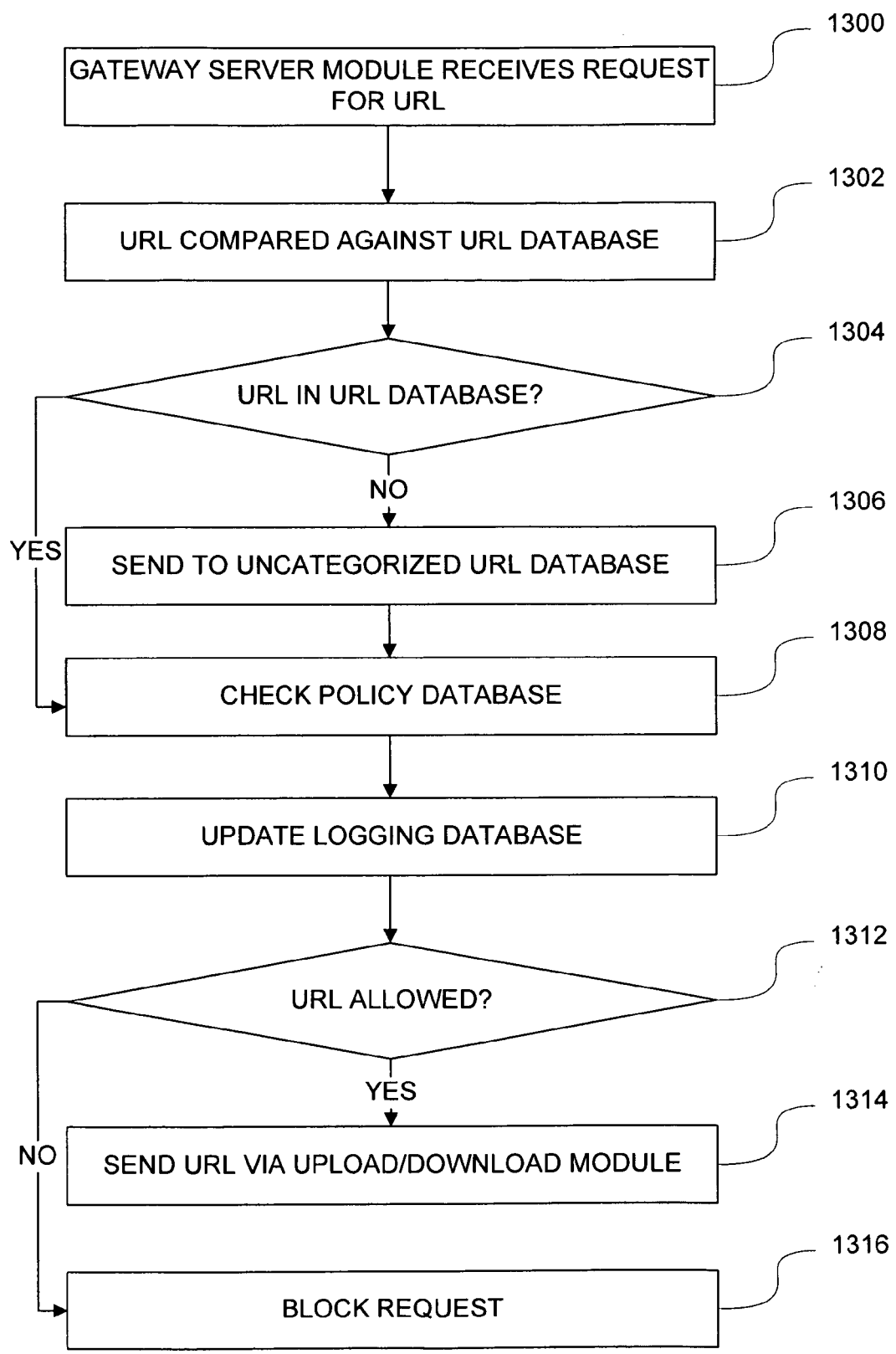
FIG. 13 is a flowchart describing how URLs may be handled by the gateway server module in conjunction with the policy module according to certain embodiments.

In some embodiments, the request of URL data may result in new records being added to the logging database 144. These records may be later transferred to the database management module 114 for further analysis. Referring now to FIG. 13, another flowchart describing a process by which the gateway server module may handle a URL request is provided. At block 1300, the gateway server module 120 receives a request for a URL. As noted above, this request may come from a workstation 116. At block 1302, the URL is then compared against the categorized URL database 146, and the system determines at block 1304 whether the requested URL is in the categorized URL database.

If the URL is already in the categorized URL database 146, the process skips to block 1308. If the requested URL is not found in the categorized URL database 146, however, the process moves to block 1306 where the URL is inserted into the uncategorized URL database 147. (In some embodiments, the logging database 144 and the uncategorized URL 147 database may be the same database.) After inserting the URL into the database, the method proceeds to block 1308. At block 1308, the policy database is checked for instructions on how to handle the received URL. Once the policy module 142 has been checked, the logging database 144 is updated to record that the URL has been requested at block 1310. After updating the logging database 144, if the workstation 116 is permitted to access the URL by the policy database, the process moves to block 1314 and the URL request is sent to the Internet 112. If, however, the policy database does not allow the request, the process skips to block 1316 and the request is blocked.

Figure 14:
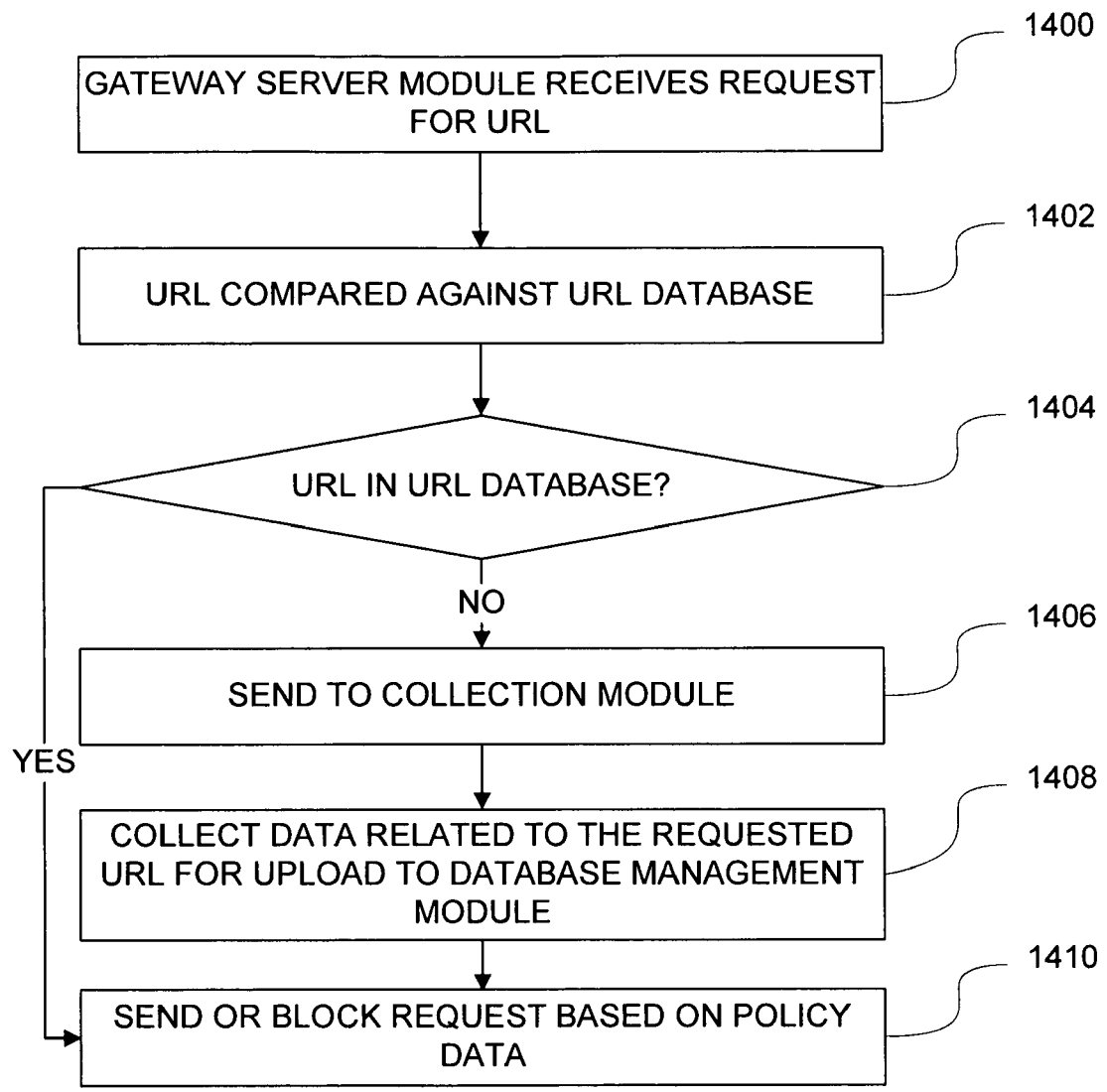
FIG. 14 is a flowchart describing the how the collection system may handle a URL within the gateway server module.

In some embodiments, the gateway server module 120 may perform collection to lessen the burden on the collecting system 182 of the database management module 114. FIG. 14 provides an example of a system in which the gateway server collection module 140 is used to collect data about an uncategorized URL. At block 1400, the gateway server module receives a request for a URL. Next, at block 1402, the requested URL is compared against the categorized URL database. If the system determines that the requested URL is in the URL database at block 1404, the process moves to block 1410, where the request is either forwarded to the Internet 112 or blocked depending on how the URL is categorized.

If the requested URL is not in the categorized URL database 146, the process moves to block 1406 where the URL is sent to the gateway collection module 140. Next, at block 1408, the collection module 140 collects URL data about the requested URL. In some embodiments, this data may be stored in the uncategorized URL database 147. Alternatively, this data may simply be forwarded to the database management module 114 via the Internet 112. Once the data has been collected and stored, the process moves to block 1410 where the URL request is either allowed or blocked based on the policies indicated in the policy module 142.

As discussed previously, uncategorized URL data may be sent from the gateway server module 120 to the database management module 114 for further analysis so that the URL may be categorized and added to the categorized URL database 146. However, because the volume of uncategorized data is so large at times, it may not be possible to categorized all of the received data without compromising accuracy. As a result, in some instances, it may be desirable to identify candidate URLs within the uncategorized data that are most likely to present a threat to workstations 116 and networks 110.

Figure 15:
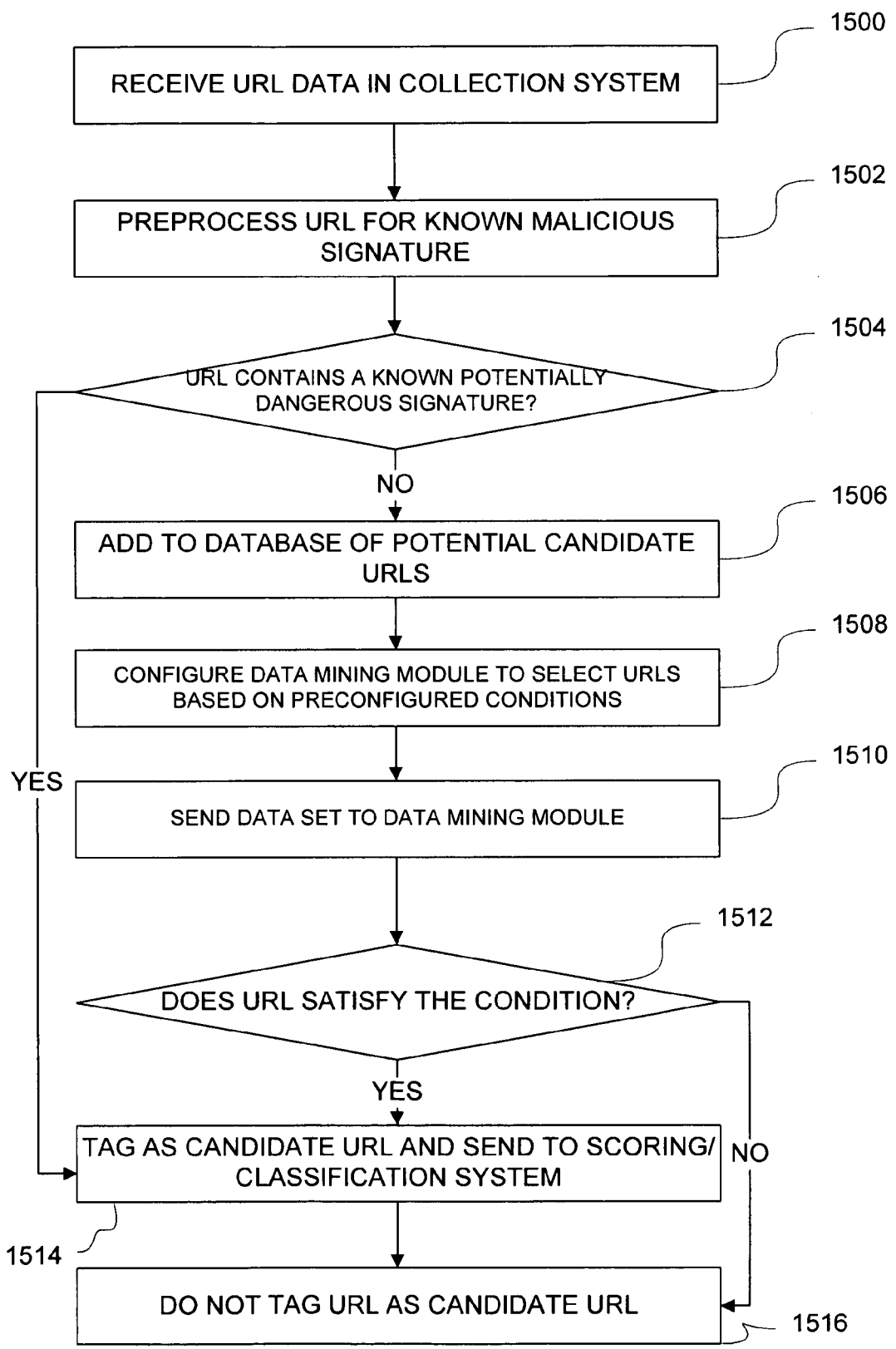
FIG. 15 is a flowchart describing the how the collection system may handle a URL within the database management module.

FIG. 15 provides an example of a method for identifying candidate URLs for further analysis. The method starts with a URL being received into the collection system 182 of the database module 114. At block 1502, the URL or application is preprocessed to determine whether it carries a known malicious data element or data signature. Next, at block 1504, if the system determines that the URL includes a known malicious element, the process skips to block 1514 where the URL is tagged as a candidate URL and sent to the training system 184 for further analysis. If the initial analysis of the URL in block 1504 does not reveal a malicious element, the process moves to block 1506, where the URL is added to a database of potential candidate URLs. Next, at block 1508, the data mining module 192 is configured to select URLs from sources 194 (of which the database of potential candidate URLs is one) based on preconfigured conditions such as attack strings, virus signatures, and the like. The data set including all of the data sources 194 is then sent to the data mining module 192 at block 1510, where each URL is analyzed by the data mining module 192 at block 1512. If the URL satisfies the defined preconfigured conditions, the process moves to bock 1514 where the URL is tagged as a candidate URL and sent on to the scoring/classification system 186 for additional analysis. If, however, the URL does not meet the conditions specified for converting it to a candidate URL, the method proceeds to block 1516 and the URL is not tagged as a candidate. Although this embodiment is described in the context of URL candidate classification, one of skill in the art will readily appreciate that applications may be similarly analyzed and tagged as candidates using the process described above.

Figure 16:
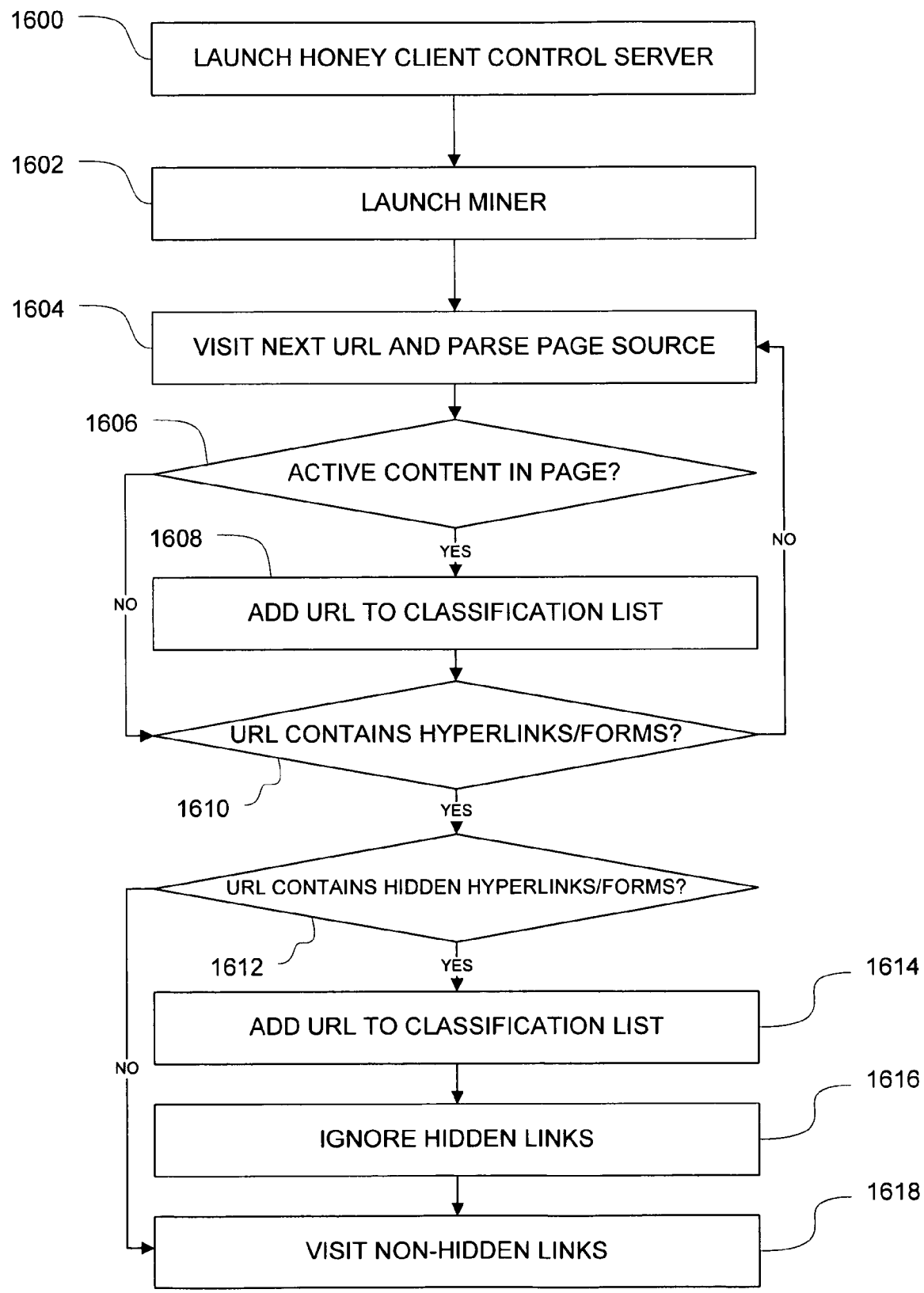
FIG. 16 is a flowchart describing how the honey client control server may be used to collect URL data.

In another embodiment, the system may utilize the honey client system 208 in conjunction with the data mining system 192 to collect URLs to be added to the candidate URL list for classification. FIG. 16 illustrates an example of a process for collecting this data. At block 1600, the honey client control server 220 is launched. The control server 220 then launches one or more honey miners 222 at block 1602. Next, at block 1604, the honey miners 222 visit the next URL provided to them by the control servers 220 and parse the page source of that URL to determine if there is active content in the URL at block 1606. If no active content is found in the page, the process skips to block 1610. If however, active content is found the process moves to block 1608 where the URL is added to the candidate URL list.

Next at block 1610, the miner 222 determines whether the current URL contains hyperlinks or forms. If no hyperlinks or forms are found, the process loops back to block 1604 where the miner receives another URL from the control server 222 for analysis. If, however, the URL contains hyperlinks or forms, the method proceeds to block 1612 where it then determines whether the URL includes hidden links or forms. Because many malicious websites wish to avoid detection by mining software such as the honey clients systems 208, they include hidden hyperlinks that are not visible when browsed by a human. Thus, the website can detect a miner by hiding these links as "bait." One technique used to hide the links is to make them the same color as the background of the web page. If the miner follows the links, then the website is alerted to its presence.

In the method provided in FIG. 16, the miner is configured to detect these hidden links. If no hidden links are present, the process skips to block 1618, and the miner continues by following the non-hidden links that are in the URL content. If however, any hidden links are present, at block 1614, the URL and its hidden links are added to the classification list and passed over at block 1616. Once the hidden links have been processed (i.e., added to the classification list), the method then proceeds to block 1618 where the non-hidden links are followed.

Figure 17:
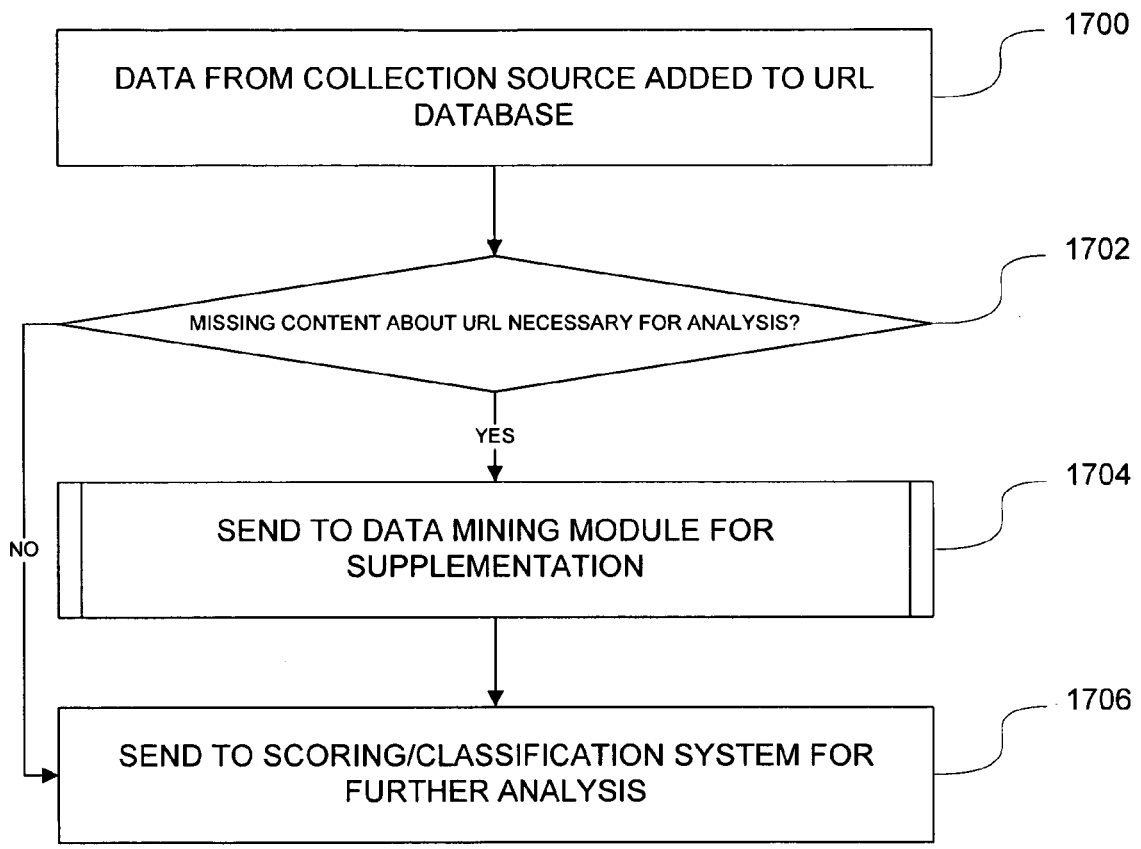
FIG. 17 is a flowchart describing how data collected by the collection system may be further supplemented to allow for detailed analysis.

In some embodiments, URL data is added to the URL/content database 180 without all of the necessary data for full analysis by the scoring/classification system 186. For example, sometimes the only data received about a URL from a collection source 194, is the URL string itself. Thus, it may become necessary to collect additional data about URLs in order properly analyze them. Referring now to FIG. 17, a process is shown describing how the system may handle candidate URLs according to one embodiment. At block 1700, data from a collection source is added to the URL/content database 180. As discussed previously, the URL/content database 180 may be a data warehouse. Next, at block 1702, the system looks at the URL data and determines whether there is missing content that is necessary for analysis. In some configurations, if the content of the URL is not in the data warehouse, the system determines that more data is needed and sends the URL to the data mining module for supplementation at block 1704. The data mining module then may take the data received and collect additional data. If no content is missing, the URL is immediately sent to the scoring/classification module 186 for further analysis at block 1706.

Figure 18:
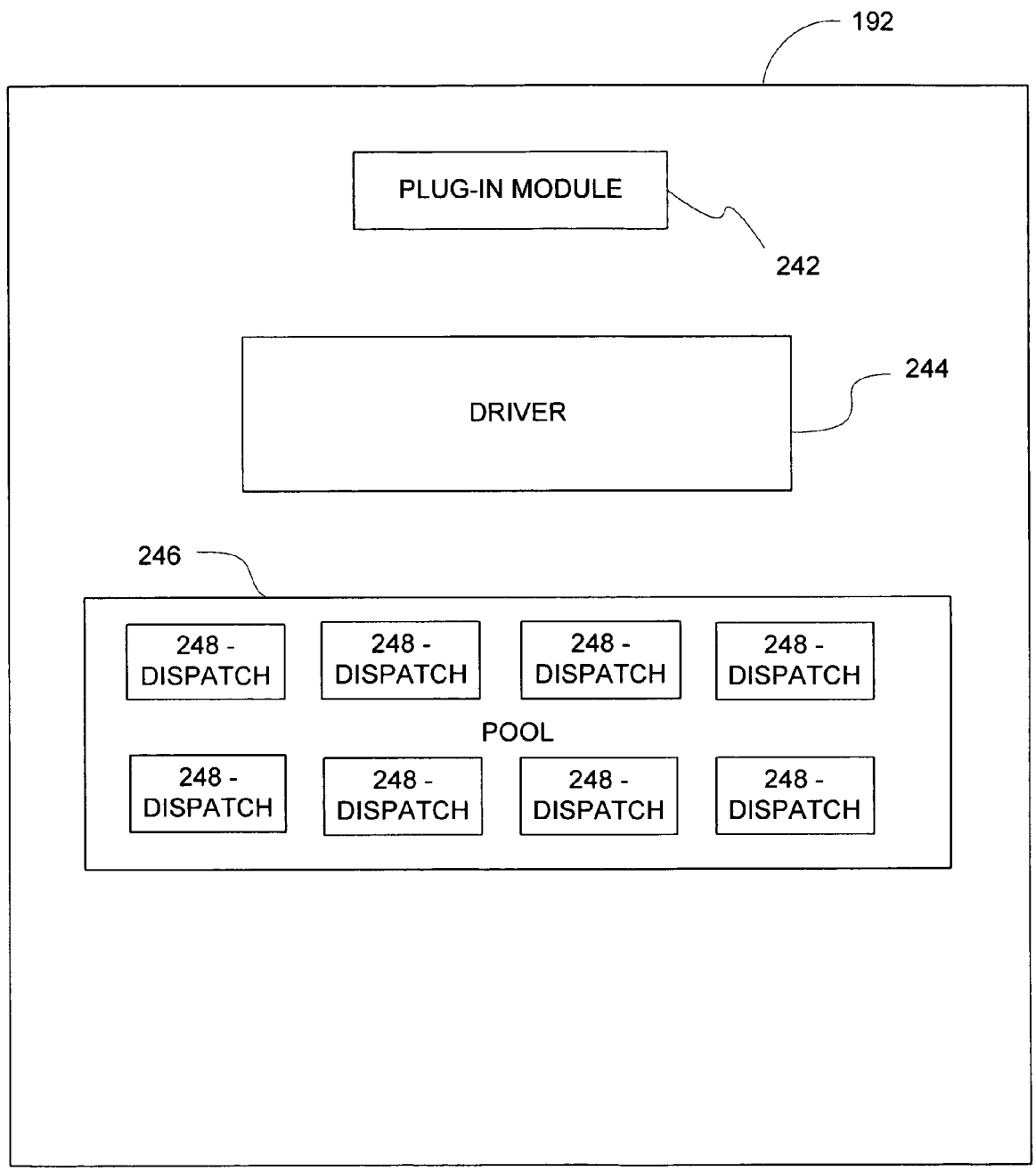
FIG. 18 is a block diagram of a data mining system.

As discussed above, one of the challenges to collecting and analyzing Internet data to determine whether it includes harmful active content is the sheer volume of data that must be collected and analyzed. In yet another embodiment, the data mining module 192 may be used to address these issues by collecting large volumes of relevant data utilize system resources effectively and efficiently. Referring now to FIG. 18, a more detailed block diagram of the data mining system 192 is provided. The data mining system 192 may take the form of a software module that runs a plurality of asynchronous processes to achieve maximum efficiency and output. The data mining system 192 may include a plug-in module 242 which receives configuration parameters which provide instruction on how inputted data should be handled. In one embodiment, the instructions received by the plug-in module may take the form of an HTTP protocol plug-in that provide parameters for the data mining system 192 to receive URL data and analyze and supplement the data based on various HTTP-related instructions implemented by the data mining system on the URL data. In another embodiment, the plug-in may be geared toward mining some other protocol such as FTP, NNTP, or some other data form.

The data mining system 192, which may also be used to implement passive honey clients, may also include a pool 246 of dispatchers 248. The dispatchers 248 are individual asynchronous processing entities that receive task assignments based on the data input (for analysis) into the data mining system and the configuration data received by the plug-in module 242. The pool 246 is a collection of the dispatchers that is controlled by a driver 244. The driver 244 is a managing mechanism for the pool. The driver 244 may be configured to monitor the activity of the dispatchers 248 in the pool 246 to determine when to send additional data into the pool 246 for mining and analysis. In one embodiment, the driver may be configured to send new data units into the pool 246 whenever any dispatchers 248 are idle. In one embodiment, the driver 244 may be utilized as a control server for managing honey client miners 222 as described above in connection with FIG. 10. The pool 246 may deliver the data unit to the idle dispatcher 248. The dispatcher 248 reads the plug-in configuration and performs actions in accordance with plug-in 242.

In one embodiment, the plug-in module may receive an HTTP plug-in. The HTTP plug-in may be configured to receive input data in the form of URL strings about which the data mining system 192 will obtain addition information such as the page content for the URL, HTTP messages returned by the URL when accessed (such as "4xx—file not found" or "5xx—server error"). The plug-in may further specify a web-crawling mode in which the dispatches, in addition to collecting page content, also add URL links within the URL content to the URL data set to be analyzed.

As used herein, "database" refers to any collection of stored data stored on a medium accessible by a computer. For example, a database may refer to flat data files or to a structured data file. Moreover, it is to be recognized that the various illustrative databases described in connection with the embodiments disclosed herein may be implemented as databases that combine aspects of the various illustrative databases or the illustrative databases may be divided into multiple databases. For example, one or more of the various illustrative databases may be embodied as tables in one or more relational databases. Embodiments may be implemented in relational databases, including SQL databases, object oriented databases, object-relational databases, flat files, or any other suitable data storage system.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. It will be understood by those of skill in the art that numerous and various modifications can be made without departing from the spirit of the present invention. Therefore, it should be clearly understood that the forms of the invention are illustrative only and are not intended to limit the scope of the invention.

What is claimed is:

1. A method of collecting data associated with a plurality of URLs, the method implemented on one or more computer processors, and comprising:
    receiving a configuration plug-in, the plug-in specifying a web-crawling mode;
    receiving URL data;
    determining a plurality of work units from the URL data, each work unit comprising a URL;
    determining whether one of a plurality of dispatchers is available for receiving one of the plurality of work units;
    sending the one of the plurality of work units to the one of the plurality of dispatchers; and
    retrieving content associated with the URL of the work unit, using the one of the plurality of dispatchers based on the web-crawling mode specified by the configuration plug-in,
    wherein at least one of the plurality of dispatchers is configured to retrieve content and store the content in a database,
    wherein at least one of the plurality of dispatchers is configured to download executable content and execute the executable content in a sandbox environment, and
    wherein at least one of the plurality of dispatchers is configured to replace the at least one of the plurality of dispatchers configured to download executable content if the at least one of the plurality of dispatchers configured to download executable content is damaged by execution of the executable content.

2. The computer-implemented method of claim 1, wherein the web-crawling mode comprises specifying the protocol with which a dispatcher is to request web content, the protocol comprising one of FTP, NNTP, or HTTP.

3. The method of claim 1, further comprising assigning each of the work units a priority.

4. The method of claim 3, wherein the one of the plurality of dispatchers to which the one of the plurality of work units is sent is determined based on at least the priority assigned to the work unit.

5. The method of claim 1, wherein at least one of the dispatchers comprises a web crawler.

6. The method of claim 1, wherein at least one of the dispatchers comprises an active honey miner.

7. The method of claim 6, wherein the active honey miner is located within the sandbox environment.

8. The method of claim 7, wherein the sandbox comprises a virtual machine emulating an operating system.

9. The method of claim 8, wherein a server records URLs visited by the active honey miner as a result of executing the executable content.

10. The method of claim 2, wherein the plug-in comprises an HTTP plug-in.

11. The method of claim 2, wherein the plug-in comprises an FTP plug-in.

12. The method of claim 2, wherein the plug-in comprises an NNTP plug-in.

13. The method of claim 1, wherein the plug-in specifies that the dispatchers add URL links within the content to the URL data to be analyzed.

14. The method of claim 1, wherein the plurality of dispatchers are controlled by a driver.

15. The method of claim 14, wherein the driver determines when additional URL data is to be received.

* * * * *